(12) United States Patent
Ohta et al.

(10) Patent No.: US 11,263,859 B2
(45) Date of Patent: Mar. 1, 2022

(54) MAINTENANCE MONITORING APPARATUS, SYSTEM, METHOD, AND PROGRAM

(71) Applicant: NEC Corporation, Tokyo (JP)

(72) Inventors: Yuko Ohta, Tokyo (JP); Shingo Takahashi, Tokyo (JP); Eisuke Saneyoshi, Tokyo (JP); Junichi Miyamoto, Tokyo (JP); Shigeru Koumoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 106 days.

(21) Appl. No.: 16/634,662

(22) PCT Filed: Aug. 2, 2017

(86) PCT No.: PCT/JP2017/028044
§ 371 (c)(1),
(2) Date: Jan. 28, 2020

(87) PCT Pub. No.: WO2019/026202
PCT Pub. Date: Feb. 7, 2019

(65) Prior Publication Data
US 2021/0090376 A1 Mar. 25, 2021

(51) Int. Cl.
*G07F 9/02* (2006.01)
*G06Q 10/00* (2012.01)
*G07F 13/00* (2006.01)

(52) U.S. Cl.
CPC .............. *G07F 9/026* (2013.01); *G06Q 10/20* (2013.01); *G07F 13/00* (2013.01)

(58) Field of Classification Search
CPC .................................. A47J 31/60; G07F 9/026

USPC .................................................. 700/231–244
See application file for complete search history.

(56) References Cited

U.S. PATENT DOCUMENTS

| 5,855,295 A | 1/1999 | Lee | |
| 9,540,124 B2* | 1/2017 | Petrini | .................. B08B 9/0821 |
| 2003/0079612 A1* | 5/2003 | Con | .................... A47J 31/4485 |
| | | | 99/275 |
| 2015/0027315 A1* | 1/2015 | Lussi | .................... A47J 31/545 |
| | | | 99/285 |

(Continued)

FOREIGN PATENT DOCUMENTS

| JP | S56-79391 A | 6/1981 |
| JP | S58-71887 U | 5/1983 |
| JP | H01-95392 A | 4/1989 |

(Continued)

OTHER PUBLICATIONS

International Search Report for PCT Application No. PCT/JP2017/028044, dated Oct. 24, 2017.

*Primary Examiner* — Timothy R Waggoner
(74) *Attorney, Agent, or Firm* — Sughrue Mion, PLLC

(57) ABSTRACT

A maintenance monitoring apparatus includes: a maintenance management part that manages, based on a monitoring result of a current or power of a vending machine that provides a beverage by extracting the beverage from a raw material, whether an operation performed on the vending machine is a predetermined maintenance operation and whether the maintenance has been executed at an appropriate time interval and as many times as necessary; and a notification part that notifies that a maintenance has been executed or not.

19 Claims, 18 Drawing Sheets

(56) References Cited

U.S. PATENT DOCUMENTS

2015/0245734 A1* 9/2015 Vogelsang .......... A47J 31/4403
99/289 R

FOREIGN PATENT DOCUMENTS

| | | |
|---|---|---|
| JP | H01-79188 U | 5/1989 |
| JP | H07-146979 A | 6/1995 |
| JP | H07-220159 A | 8/1995 |
| JP | H10-124746 A | 5/1998 |
| JP | 2001-137133 A | 5/2001 |
| JP | 2002-304657 A | 10/2002 |
| JP | 2005-165764 A | 6/2005 |
| JP | 2005-267197 A | 9/2005 |
| JP | 2007-289302 A | 11/2007 |
| JP | 2008-186226 A | 8/2008 |
| WO | 2014/196028 A1 | 12/2014 |

* cited by examiner

MAINTENANCE MONITORING APPARATUS, SYSTEM, METHOD, AND PROGRAM

This application is a National Stage Entry of PCT/JP2017/028044 filed on Aug. 2, 2017, the contents of all of which are incorporated herein by reference, in their entirety.

FIELD

The present invention relates to a maintenance monitoring apparatus, a system, a method, and a program.

BACKGROUND

In a store such as a convenience store, there is installed a coffee vending machine(s), which in response to pressing of an order button, grinds roasted beans, pours hot water to the ground beans to extract coffee and pours the extracted coffee into a cup (a disposable paper cup). In some coffee vending machines, for example, an individual customer purchases a cup and manually sets the cup in the coffee vending machine. There are other types of coffee vending machines which set a cup automatically.

When a selection button (an order button) of a coffee vending machine is pressed, the coffee vending machine performs grinding of coffee beans, performs mixing and steaming of coffee powder with hot water, and pours extracted coffee into a disposable paper cup or the like. When a self-cleaning button is pressed, the coffee vending machine performs an automated cleaning on an extraction path (a pipe) of a brewer or the like. The following describes a typical configuration example of a coffee vending machine with reference to a schematic drawing in FIG. 17. It is noted that elements schematically illustrated in FIG. 17 should not, as a matter of course, be interpreted as limitations to the present invention. When a customer or a store clerk in charge places a cup of a size of coffee which the customer has ordered on a spout and presses an order button 201b, coffee beans are supplied from a bean hopper 202 to a mill 203. Next, a mill motor operates to grind the coffee beans into powder. The coffee powder ground by the mill 203 is supplied to a brewer 205 (a unit that extracts coffee by applying pressure to ground beans. This brewer is also referred to as a "cylinder".) through a mill shoot 204. After mixing and steaming of the coffee powder with hot water supplied from a hot water tank 210, coffee is percolated through a paper filter 206 and is poured into a paper cup 213. The paper filter 206 used for extraction is automatically wound by a paper feeder 207 and is put into a waste container 208, along with coffee grounds. The hot water tank 210 receives water from a water supply tank 209. A heater 211 heats and maintains the water in the hot water tank 210 at a predetermined temperature.

Regular cleaning and maintenance are practiced on a coffee vending machine for the sake of quality maintenance of coffee provided, hygienic management such as prevention of outbreak and growth of bacteria, and equipment(device) management. More specifically, when a self-cleaning button 201a is pressed, cleaning of a coffee extraction path (for example, an extraction path from the brewer 205) is performed. In addition, a list of maintenance operations per machine model is prescribed by a coffee vending machine vendor, etc. For example, the list includes regular cleaning of the waste container 208, a drainage tray, the brewer 205, and the water supply tank 209, which are performed once a day.

Regarding maintenance operation of a vending machine, for example, PTL 1 discloses a cleaning management control apparatus that facilitates detailed cleaning management by displaying a portion that needs to be cleaned each time the number of sales is reached, which is an indication of cleaning time. This cleaning management control apparatus includes counting means for counting the number of sales achieved by a cup-type vending machine, control means for causing a display to display a portion that needs to be cleaned when the number of sales reaches the number of sales as the indication, and reset means for resetting the counter after the portion that needs to be cleaned is cleaned.

In relation to a technique for identifying an operation state of a device from a current waveform, etc. of the device, for example, PTL 2 discloses a configuration in which a device identification apparatus that monitors an operating status of an electric device, obtains an operating status of the electric device based on an AC voltage waveform and current waveform measured by a voltage/current measurement apparatus. In PTL 2, a device identification part identifies (specifies) an electric device in operation by comparing a current waveform acquired by a waveform acquisition part with a unique current waveform (by executing similarity determination using a feature vector, etc.).

In relation to detection of pressing of a sales switch of a vending machine, for example, PTL 3 discloses a vending machine that performs sales number increment processing each time a control apparatus detects pressing of a product selection switch. In this vending machine, when a customer pays by cash, the customer pays first and selects a product next, while when a customer pays with electronic money, the customer selects a product first and pays next.

PTL 1: Japanese Patent Kokai Publication No. JP-H01-095392A

PTL 2: International Publication No. WO2014/196028

PTL 3: Japanese Patent Kokai Publication No. JP2005-165764A

SUMMARY

The following describes the related technologies.

In the disclosure of PTL 1, if a vending machine sells a small number of beverages per day, it could take a number of days to reach the prescribed sales number. In this case, the vending machine is more likely to have a hygiene problem or a malfunction.

When a case of a coffee vending machine is placed at a convenience store or the like, there is a case where a store clerk who is not familiar with the vending machine is involved in cleaning of the coffee vending machine. In this case, a maintenance operation such as cleaning could not be practiced properly. In addition, only displaying cleaning time may result in a failure of practicing an appropriate maintenance operation. In this case, safety in terms of quality and hygiene is not guaranteed.

The present invention has thus been invented in view of the above issues, and it is an object of the present invention to provide a maintenance monitoring apparatus, a system, a method, and a program, each enabling monitoring of a maintenance execution status of, for example, a vending machine that provides a beverage by extracting the beverage from a raw material and enabling appropriate execution of a maintenance operation.

According to an aspect of the present invention, there is provided a maintenance monitoring apparatus, comprising: a maintenance management part that monitors a current or power of a vending machine that provides a beverage by extracting the beverage from a raw material and performs management as to whether an operation performed on the vending machine is a predetermined maintenance operation, and whether the maintenance operation is executed at an appropriate time interval and as many times as necessary; and a notification part that notifies that a maintenance has been performed or not performed.

According to another aspect of the present invention, there is provided a maintenance monitoring system comprising: a vending machine that provides a beverage by extracting the beverage from a raw material; a measurement apparatus that measures a current or power of the vending machine and transmits a measurement result via a communication unit of the measurement apparatus; and a maintenance monitoring apparatus, wherein the maintenance monitoring apparatus includes: a maintenance management part that monitors a current or power of a vending machine that provides a beverage by extracting the beverage from a raw material and manages as to whether an operation performed on the vending machine is a predetermined maintenance operation and whether the maintenance has been executed at an appropriate time interval and as many times as necessary; and a notification part that notifies that a maintenance has been executed or not.

According to still another aspect of the present invention, there is provided a maintenance monitoring method, comprising:

monitoring a current or power of a vending machine that provides a beverage by extracting the beverage from a raw material;

managing as to whether an operation performed on the vending machine is a predetermined maintenance operation and whether the maintenance is executed at an appropriate time interval and as many times as necessary; and notifying that a maintenance has been executed or not.

According to still another aspect of the present invention, there is provided a program causing a computer to execute processing comprising:

monitoring a current or power of a vending machine that provides a beverage by extracting the beverage from a raw material;

managing as to whether an operation performed on the vending machine is a predetermined maintenance operation and whether the maintenance is executed at an appropriate time interval and as many times as necessary; and notifying that a maintenance has been executed or not.

According to the present invention, there is provided a non-transitory computer-readable recording medium such as a semiconductor storage such as a computer-readable recording medium storing the program (for example, a random access memory (RAM), a read-only memory (ROM), or an electrically erasable and programmable ROM (EEPROM)), a hard disk drive (HDD), a compact disc (CD), or a digital versatile disc (DVD).

The present invention enables monitoring of a maintenance execution status of a vending machine and an appropriate execution of a maintenance operation. Still other features and advantages of the present invention will become readily apparent to those skilled in this art from the following detailed description in conjunction with the accompanying drawings where only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

DETAILED DESCRIPTION

Figure 16:
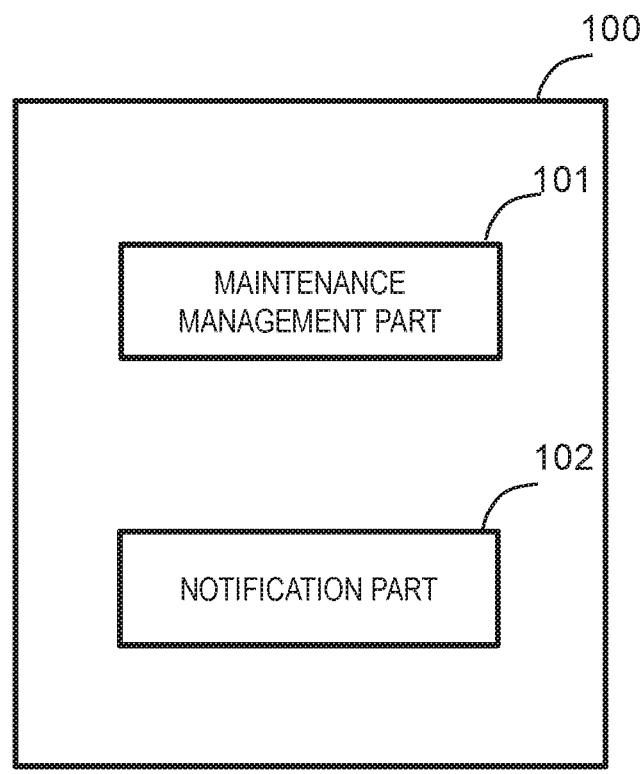
FIG. 16 is a diagram illustrating a configuration according to a basic mode of the present invention.

An example embodiment of the present invention will be described. As illustrated in FIG. 16, a maintenance monitoring apparatus 100 according to one of embodiments of the present invention includes a maintenance management part 101 which manages, based on a monitoring result of a signal of a vending machine that provides a beverage(s) by extracting the beverage from a raw material(s), whether an operation (behavior) performed on the vending machine is a predetermined maintenance operation and whether the maintenance has been executed at an appropriate timing and as many times as necessary, and a notification part 102 which notifies that a maintenance has been executed or not. In addition, according to one of embodiments of the present invention, there is provided a maintenance monitoring method including steps of managing, based on a monitoring result of a signal of a vending machine that provides a beverage(s) by extracting the beverage from a raw material (s), whether an operation performed on the vending machine is a predetermined maintenance operation and whether the maintenance has been executed at an appropriate timing and as many times as necessary, and notifying that a maintenance has been executed or not. As will be described below, the maintenance management part 101 and the notification part 102 may be implemented as a computer program executed on a computer system such as a server apparatus.

According to one of embodiments of the present invention, the maintenance management part 101 may compare a measured value of current or power of the vending machine with a predetermined threshold value (a) to determine, based on a result of the comparison, whether the operation performed on the vending machine is a maintenance operation executed in response to pressing of a self-cleaning button.

According to one of embodiments of the present invention, as a result of a comparison between a measured value of current or power of the vending machine and a first threshold value (a0), when the maintenance management part 101 determines that the operation is not a maintenance operation executed in response to pressing of a self-cleaning button, the maintenance management part 101 may determine whether or not the operation is a manual-cleaning maintenance operation based on the measurement result of the current or power of the vending machine. In this case, if time (T) during when the measured value of the current or power of the vending machine is continuously greater than or equal to a second threshold value (b) and less than or equal to a third threshold value (c) is within a predetermined time range ($T_1 \leq T \leq T_2$), the maintenance management part 101 may determine that the operation is the manual-cleaning maintenance operation.

According to one of embodiments of the present invention, when the maintenance management part 101 compares a measured value of current or power of the vending machine with the predetermined threshold value (a), if the measured value is greater than or equal to the threshold value (a), the maintenance management part 101 may acquire a power or current waveform of the vending machine and compare the acquired waveform with a previously learned learning model of a power or current waveform of an automated cleaning operation sequence. In this case, when an accuracy of an estimation result is greater than or equal to a predetermined value, the maintenance management part 101 may determine that the operation is an automated cleaning maintenance operation.

According to one of embodiments of the present invention, when the maintenance management part 101 compares a measured value of current or power of the vending machine with a predetermined fourth threshold value (d), if the measured value is greater than or equal to the fourth threshold value (d), the maintenance management part 101 acquires a power or current waveform (w1) of the vending machine and stores the waveform (w1) in a storage unit. If the measured value is less than the fourth threshold value (d), the maintenance management part 101 compares the measured value with a predetermined fifth threshold value (e) (d>e). If the measured value is greater than or equal to the fifth threshold value (e), the maintenance management part 101 acquires a power or current waveform (w2) of the vending machine and stores the waveform (w2) in a storage unit. In a case where the stored waveform is the waveform w1, the maintenance management part 101 may compare the waveform w1 with a learning model of a first automated cleaning operation learned in advance (for example, a learning model of an automated cleaning operation with a heater operation) and estimate an operation corresponding to the waveform w1. In a case where the stored waveform is the waveform w2, the maintenance management part 101 may compare the waveform w2 with a learning model of a second automated cleaning operation learned in advance (for example, a learning model of an automated cleaning operation without a heater operation) and estimate an operation corresponding to the waveform w2. If an accuracy of an estimation result is greater than or equal to a predetermined value, the maintenance management part 101 may determine that the operation is an automated cleaning maintenance operation.

According to one of embodiments of the present invention, when the maintenance management part 101 compares a measured value of current or power of the vending machine with a predetermined sixth threshold value (a), if the measured value is greater than or equal to the sixth threshold value (a), the maintenance management part 101 acquires the power or current waveform (w1) of the vending machine and stores the waveform (w1) in a storage unit. If the measured value is less than the sixth threshold value (a), the maintenance management part 101 compares the measured value with a predetermined seventh threshold value (f) (a>f). If the measured value is greater than or equal to the seventh threshold value (f), the maintenance management part 101 acquires the power or current waveform (w2) of the vending machine and stores the waveform (w2) in a storage unit. The maintenance management part 101 may compare the stored waveform with a previously learned learning model (A) of a power or current waveform of a beverage extraction operation and a previously learned learning model (B) of a power or current waveform of an automated cleaning operation and estimate an operation corresponding to the corresponding waveform. If an accuracy of an estimation result is greater than or equal to a predetermined value, the maintenance management part 101 may determine that the operation is the automated cleaning maintenance operation.

According to one of embodiments of the present invention, if the maintenance management part 101 determines that the operation is a maintenance operation, the maintenance management part 101 may store date and time of the maintenance operation in a storage unit and increment the number of executed maintenance operations by one. If the number of executed maintenance operations reaches a predetermined prescribed number, the maintenance management part 101 may output, via the notification part 102, a message that the maintenance has been completed within a predetermined time (for example, within a day).

According to one of embodiments of the present invention, if the maintenance management part 101 determines that the operation is not a maintenance operation and an elapsed time since the last maintenance operation exceeds a predetermined time, the maintenance management part 101 may output, via the notification part 102, a message that a maintenance has not been executed (no execution of a maintenance).

According to one of embodiments of the present invention, if the maintenance management part 101 determines that the operation is a manual-cleaning maintenance operation and if the manual-cleaning maintenance operation has been performed at predetermined time intervals, the maintenance management part 101 may output, via the notification part 102, a message that the manual-cleaning maintenance has been completed. Alternatively, if the maintenance management part 101 determines that the operation is a manual-cleaning maintenance operation, the maintenance management part 101 may increment the number of executed manual-cleaning maintenance operations by one. If the number of executed manual-cleaning maintenance operations reaches a predetermined prescribed number, the maintenance management part 101 may output, via the notification part 102, a message that the manual-cleaning maintenance has been executed. If the manual-cleaning maintenance has not been executed at the predetermined time intervals, the maintenance management part 101 may output, via the notification part 102, a message that a maintenance has not been executed.

According to one of embodiments of the present invention, even if an elapsed time since the last maintenance operation has not exceeded a predetermined time, if the number of sales of beverages of the vending machine since the last maintenance time has exceeded a predetermined number, the maintenance management part 101 may output a message that a maintenance has not been executed (no execution of a maintenance).

A system according to one of embodiments of the present invention may include: a vending machine that provides a beverage(s) by extracting the beverage(s) from a raw material(s); a measurement device that measures a current or power of the vending machine and transmits a measurement result; and a maintenance monitoring apparatus that receives a measurement result obtained by the measurement device, determines, based on the measurement result, whether an operation performed on the vending machine is a predetermined maintenance operation, manages as to whether the maintenance has been executed at an appropriate time interval and as many times as necessary, and notifies that a maintenance has been executed or not.

According to one of embodiments of the present invention, for example, by monitoring history information about daily maintenance operations or maintenance execution statuses and by notifying, for example, a store manager or a store clerk in charge of maintenance operations of a store at which a vending machine for beverages such as coffee is installed, a maintenance operation is executed in accordance with a manual. Thus, a missing of the maintenance can be prevented. As a result, since a risk of malfunction of the vending machine can be reduced, a quality of a beverages provided to a customer(s), etc. can be maintained.

According to one of embodiments of the present invention, an owner, a borrower, etc. of a vending machine for a beverage such as coffee can grasp a daily maintenance status. Thus, the present invention contributes to reduction in opportunity loss.

According to one of embodiments of the present invention, vendors of vending machines for beverages such as coffee can guarantee, for example, the hygiene of the vending machines and the maintenance conditions of the machines. For example, when a maintenance of a vending machine has not been sufficiently executed, a vendor person in charge of maintenance of the vending machine may visit the site and perform maintenance on spot in some cases. However, according to one of embodiments of the present invention, since maintenance operations are sufficiently executed, the number of spot maintenance operations can be reduced.

The following describes example embodiments in which a coffee vending machine that executes automated cleaning of an extraction part such as a brewer in response to pressing of a self-cleaning button is used as an example. Regarding elements of individual parts of a coffee vending machine, reference will be made to FIG. 17 as needed. The reference to FIG. 17 will be made only for ease of understanding and not to limit the invention. Namely, the coffee vending machine to which the example embodiments are applied will not as a matter of course be limited to the configuration in FIG. 17. In addition, the present invention is, as a matter of course, applicable to any vending machine that extracts a beverage(s) from a raw material(s) to provide the beverage(s) and that includes a maintenance function such as automated cleaning.

Example Embodiment 1

Figure 1:
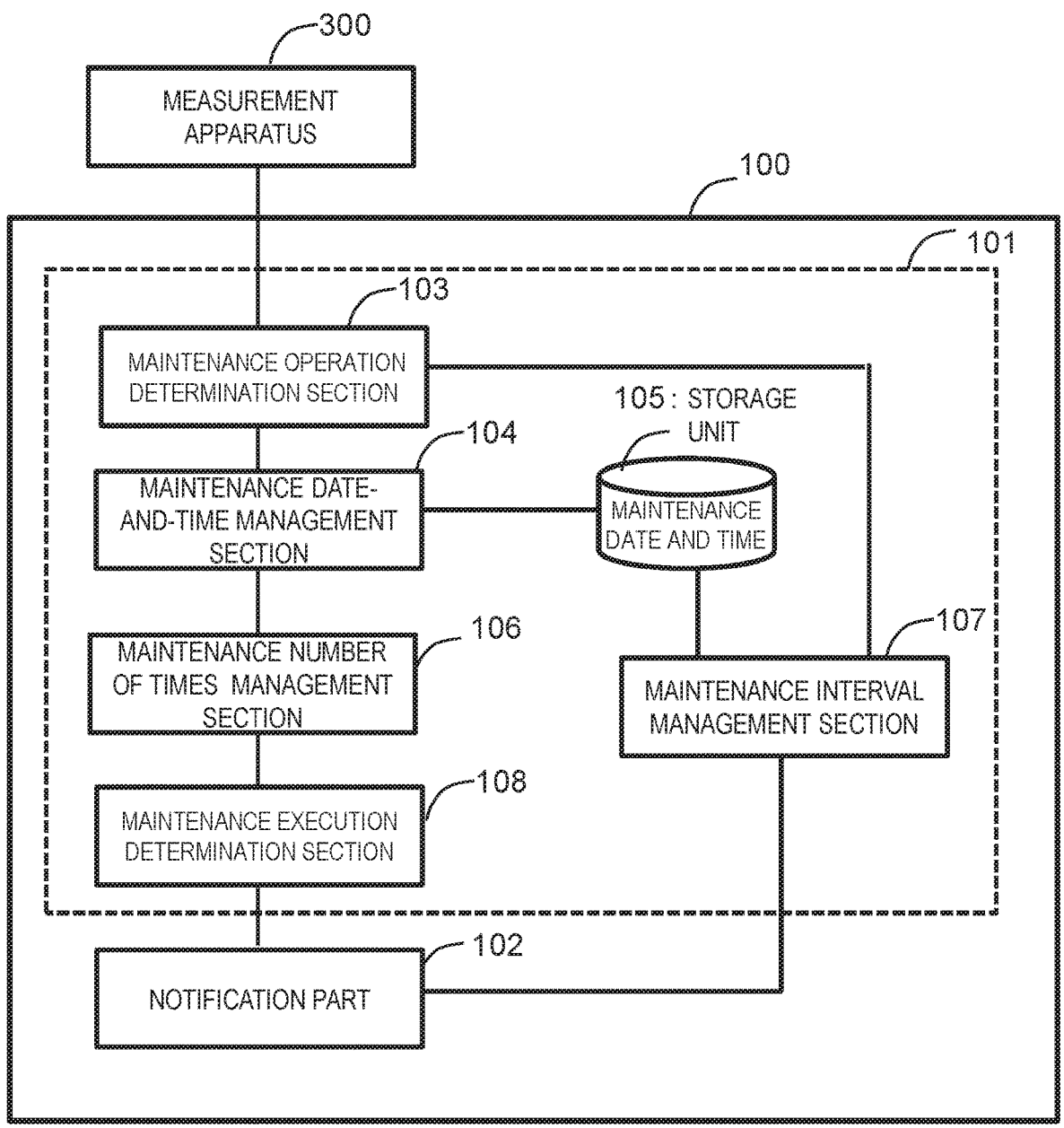
FIG. 1 a diagram illustrating a configuration example of a maintenance monitoring apparatus according to an example embodiment of the present invention.

FIG. 1 illustrates a configuration of a maintenance monitoring apparatus according to an example embodiment. As illustrated in FIG. 1, a maintenance monitoring apparatus 100 includes a maintenance management part 101 which manages, based on a measurement result obtained by a measurement apparatus 300 that measures a current or power of a vending machine that provides a beverage(s) by extracting the beverage(s) from a raw material(s), whether an operation performed on the vending machine is a predetermined maintenance operation and whether the maintenance has been executed at an appropriate timing and as many times as necessary, and a notification part 102 which notifies that a maintenance has been executed or not.

The maintenance management part 101 includes a maintenance operation determination section 103 that acquires a measurement result from the measurement apparatus 300 and that determines whether the operation is a maintenance operation, a maintenance date-and-time management section 104 that holds a maintenance execution date and time in a storage unit 105 when a maintenance operation is determined, a maintenance number of times management section 106 that includes a counter (not illustrated) that counts the number of maintenance operations, a maintenance interval management section 107 that monitors whether a maintenance operation is performed at a predetermined time interval, and a maintenance execution determination section 108 that determines whether a maintenance has been executed a predetermined number of times (a prescribed number of times).

The notification part 102 notifies, a display apparatus and/or a file apparatus not illustrated, or a terminal apparatus and so forth not illustrated via a communication means not illustrated, that a maintenance has been executed a predetermined number of times or has not been executed. The notification part 102 may include a display apparatus, a file apparatus, or communication means. It is noted that the configuration of the maintenance monitoring apparatus 100 in FIG. 1 is a basic configuration common to the following second to eighth example embodiments.

Figure 2:
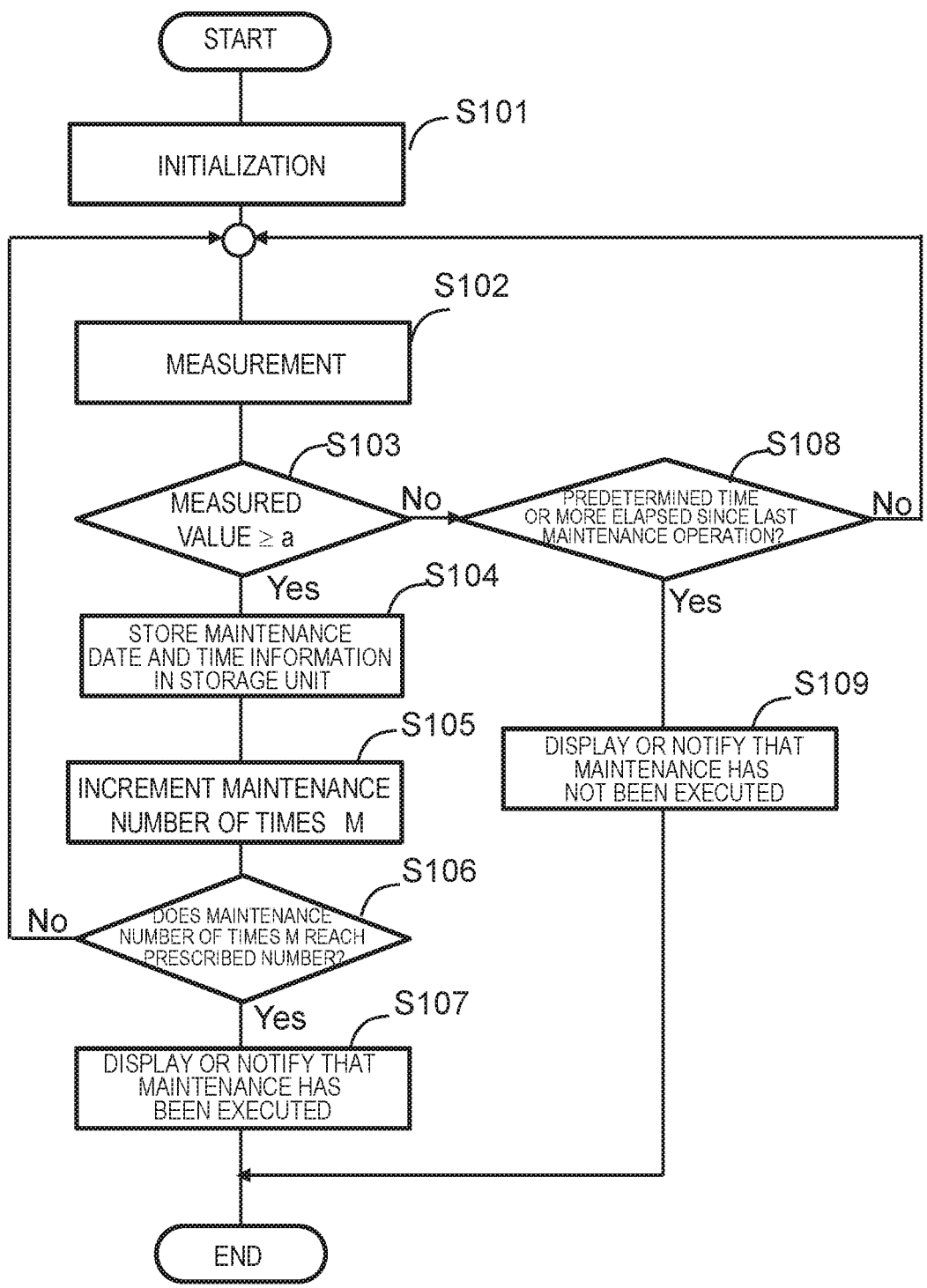
FIG. 2 is a flowchart illustrating an example of a processing procedure according to a first example embodiment of the present invention.

FIG. 2 is a flowchart illustrating a processing procedure of the maintenance monitoring apparatus 100 according to the first example embodiment. As illustrated in FIG. 2, in initialization processing, for example, the maintenance monitoring apparatus 100 resets a counter (not illustrated) that counts the number of times M of maintenance operations, a flag (not illustrated) that manages as to whether to execute a maintenance operation, etc. (step S101). Though not particularly limited thereto, for example, the number of times of maintenance operations that need to be executed per day such as cleaning of a coffee extraction pipe is set in a memory or the like not illustrated.

The maintenance monitoring apparatus 100 acquires a measured value from the measurement apparatus 300 that measures power or a current of the coffee vending machine (step S102).

The maintenance operation determination section 103 receives the measured value of the power or the current of the coffee vending machine measured by the measurement apparatus 300, determines whether the measured value is greater than or equal to a predetermined threshold value (a), and determines whether an operation is a maintenance operation (for example, a maintenance operation executed in response to pressing of a self-cleaning button (201a in FIG. 17, for example)) (step S103). The measured value of power or current may be an effective power or a current RMS (root mean square) value.

If the measured value is greater than or equal to the predetermined threshold value (a) (Yes in step S103), the maintenance date-and-time management section 104 stores maintenance date and time in the storage unit 105 (step S104). The maintenance date-and-time management section 104 may acquire current date and time from, for example, a timer (system clock) not illustrated that is included in the maintenance monitoring apparatus 100 and store the current date and time in the storage unit 105 as the maintenance execution date and time. Alternatively, in a case where the measurement date and time information along with the measured value are transmitted from the measurement apparatus 300 to the maintenance monitoring apparatus 100, when the measured value is greater than or equal to the predetermined threshold value (a), the maintenance date-and-time management section 104 may store corresponding measurement date and time information in the storage unit 105, as the maintenance execution date and time. An arbitrary communication interface and handshake may be adopted between the maintenance monitoring apparatus 100 and the measurement apparatus 300. For example, the maintenance monitoring apparatus 100 may be configured to give an instruction for measuring a current or power to the measurement apparatus 300 which on reception of the instruction, may measure a current or power and transmit the measurement result to the maintenance monitoring apparatus 100.

As a result of the determination by the maintenance operation determination section 103, when the maintenance operation is an automated cleaning operation, the maintenance number of times management section 106 increments the maintenance number of times M (step S105). If the maintenance number of times M reaches a prescribed number per day (for example, 4) (for example, the automated cleaning button (201a in FIG. 17, for example) has been pressed a prescribed number of times per day) (Yes in step S106), the maintenance execution determination section 108 determines that the maintenance has been executed, and the notification part 102 notifies that the maintenance has been executed (namely, an automated cleaning maintenance has been executed the prescribed number of times).

In contrast, if the maintenance number of times M has not yet reached the prescribed number (No in step S106), control is returned to step S102.

As a result of the determination by the maintenance operation determination section 103, if the measured value is less than the threshold value (a) (No in step S103), the maintenance interval management section 107 refers to the current date and time and the date and time of a last maintenance operation stored in the storage unit 105 and determines whether a predetermined time or more has elapsed without a maintenance operation since the last maintenance operation (step S108).

If the predetermined time or more has elapsed (Yes in step S108), the maintenance interval management section 107 notifies, via the notification part 102, that a maintenance has not been executed (for example, a maintenance that needs to be executed at a predetermined time interval has not been executed) (step S109). This notification may be displayed on an alarm lamp or the like of the corresponding vending machine. Alternatively, the notification may be given to an in-store management terminal, a POS (Point Of Sales) register, or a portable terminal of a person in charge, for example. If the predetermined time or more has not elapsed (No in step S108), control is returned to step S102, and the measurement by the measurement apparatus 300 is performed.

Regarding realization of the processing procedure illustrated as an example in FIG. 2, each time the measurement apparatus 300 measures current or power, the measurement apparatus 300 may transmit the measured value to the maintenance monitoring apparatus 100. Alternatively, the measurement apparatus 300 may include a storage unit (buffer) that holds measurement results, temporarily store sampled values (waveform data) of current or power of the coffee vending machine in the storage unit (buffer), and transmit the sampled values to the maintenance monitoring apparatus 100 via a communication network or the like by using a communication function of the measurement apparatus 300. The measurement apparatus 300 may transmit information about a date and time on which the measurement apparatus 300 has acquired current or power value (waveform) to the maintenance monitoring apparatus 100 along with a corresponding measured value (waveform). The maintenance monitoring apparatus 100 may temporarily store the measured value (waveform) of current or power received from the measurement apparatus 300 in a buffer memory or the like not illustrated that is included in the maintenance monitoring apparatus 100 in association with corresponding date and time information. The maintenance operation determination section 103 may detect a transition of the measured value stored in the buffer memory from a value less than the predetermined threshold value (a) to a value greater than or equal to the threshold value (a) and store date and time when the transition occurs, in the storage unit 105.

In FIG. 1, the measurement apparatus 300 may be constituted by a power tap (also termed as a "smart power tap") that includes a measurement device equipped with a communication function such as a wireless LAN (Local Area Network), into which a power plug of the coffee vending machine is inserted. In this case, the measurement apparatus 300 may upload a measurement result to the maintenance monitoring apparatus 100 via the wireless LAN by using the communication function incorporated into the power tap.

Figure 9:
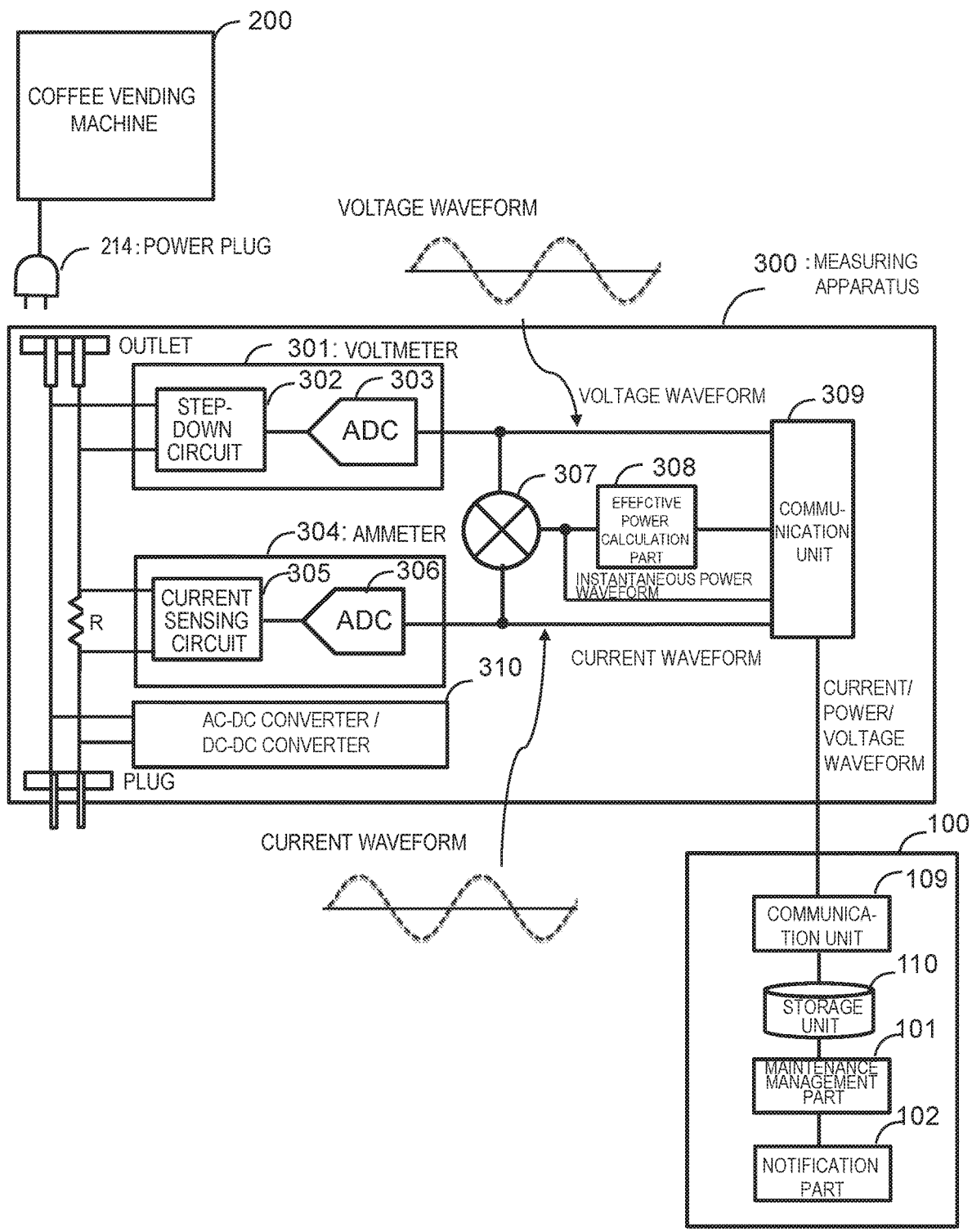
FIG. 9 is a diagram illustrating an example of a system according to an example embodiment of the present invention.

FIG. 9 schematically illustrates an example of a system configuration including the maintenance monitoring apparatus 100 according to the first example embodiment. The configuration of the measurement apparatus 300 is not, as a matter of course, limited to the configuration in FIG. 9. In the example in FIG. 9, for example, the measurement apparatus 300 is constituted by a smart power tap having a consent on one side into which a power plug 214 of a coffee vending machine 200 is inserted and having a plug on another side which is inserted to a power tap (not illustrated). In FIG. 9, the measurement apparatus 300 may include a voltmeter 301 that measures a voltage between terminals of the coffee vending machine (load) and an ammeter 304 that measures a current flowing through the coffee vending machine (load). The voltmeter 301 includes a step-down circuit 302 that steps down a voltage between terminals of the load and an analog-to-digital converter 303 that converts an analog output voltage of the step-down circuit 302 to a digital signal. The ammeter 304 includes a current sensing circuit 305 that senses the current flowing through the power supply line (load) and an analog-to-digital converter 306 that converts an analog output voltage of the current sensing circuit 305 to a digital signal.

Voltage waveform data from the analog-to-digital converter 303 of the voltmeter 301 and power waveform data from the analog-to-digital converter 306 of the ammeter 304 are multiplied by, for example, a multiplier 307, and an instantaneous power waveform is obtained. The instantaneous power waveform is smoothed by an effective power calculation part 308 which calculate an effective power. The voltage waveform data, the power waveform data, the instantaneous power waveform, and the effective power value are supplied to a communication unit 309 and are transmitted to the maintenance monitoring apparatus 100. In FIG. 9, an AC (Alternate Current)-DC (Direct Current) converter/DC-DC converter 310 generates a DC (direct current) power supply from an AC (alternate-current) power supply and supplies the DC power supply to the analog-to-digital converters 303 and 306, the multiplier 307, the effective power calculation part 308, and the communication unit 309. In FIG. 9, while a single-phase two-wire system AC is illustrated as an example, measurement is also possible by using three number of single-phase wattmeters in a case of a three-phase three-wire system AC, for example. Alternatively, the power may be measured based on a two-wattmeter method.

As illustrated in FIG. 9, the maintenance monitoring apparatus 100 in FIG. 1 may include, for example, a communication unit 109 and a storage unit (buffer memory) 110. The communication unit 109 communicates with the communication unit 309 of the measurement apparatus 300 via a network, receives necessary waveform data out of current waveform data, voltage waveform data, instantaneous power waveform data, etc., and stores the received waveform data in the storage unit (buffer memory) 110. Regarding the current waveform data received from the measurement apparatus 300, the communication unit 109 may store, in the storage unit (buffer memory) 110, information about an identification number (identification name) (Identity: ID) of the measurement apparatus 300 (alternatively, an ID of an electric device under measurement) and information about a sampling time of power, current waveform data or the like. The maintenance management part 101 may read waveform data (for example, current waveform data) of a necessary length stored in the buffer memory 110 to obtain a measured value of current (for example, instantaneous current, effective (RMS) current value, or the like).

In FIG. 9, the current sensing circuit 305 measures a voltage between terminals of a shunt resistor (R) inserted in a power supply line, for example. However, the present example embodiment is not limited to this configuration. For example, the current sensing circuit 305 may be constituted by a CT (Current Transformer) which adopts a current transformer structure in which a coil is wound around a magnetic core and which sandwiches a power supply wiring cable of the coffee vending machine, performs conversion from a sensed value of a magnetic flux flowing through a magnetic core to detect a current.

Alternatively, a current sensor may be inserted in a main or branch power supply wiring of a distribution board that supplies power to the coffee vending machine 200.

Figure 10:
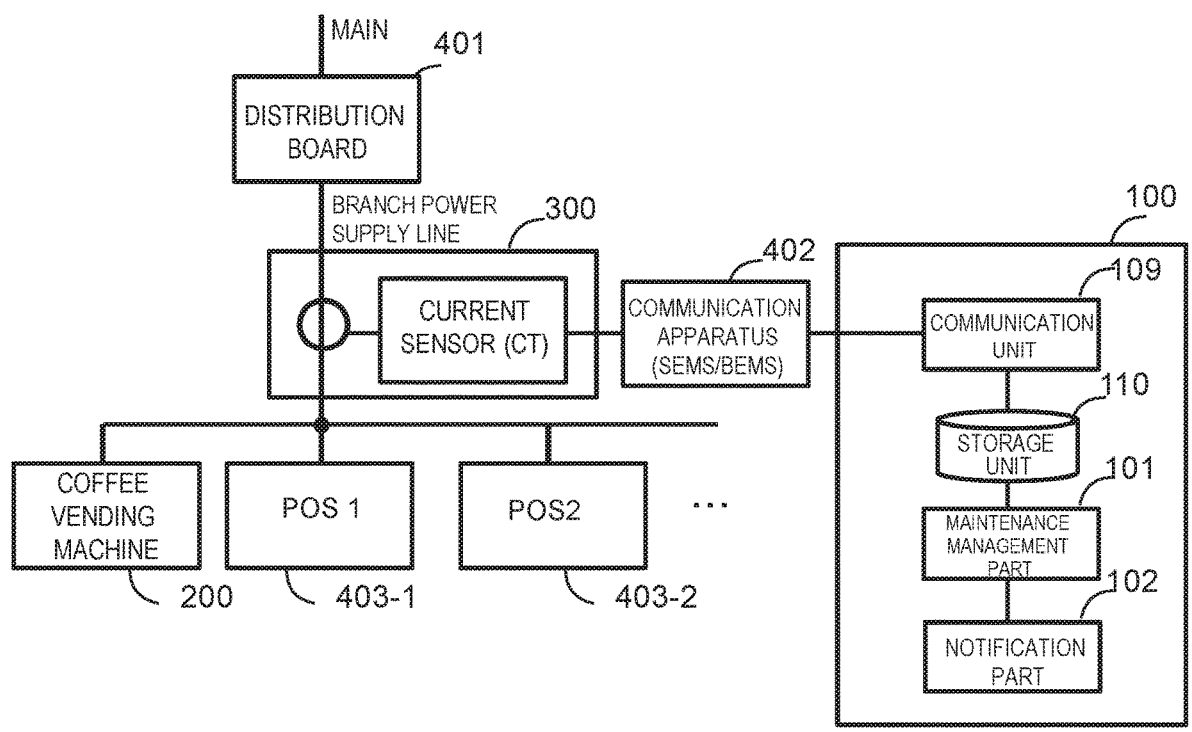
FIG. 10 is a diagram illustrating another example of a system according to an example embodiment of the present invention.

For example, as illustrated as an example in FIG. 10, a power supply current obtained by causing the measurement apparatus (current sensor) 300 to sense a current flowing through a branch power supply wiring of a distribution board 401 may be transferred to the maintenance monitoring apparatus 100 via a communication apparatus 402 (the power supply current is a composite current waveform of products including the coffee vending machine 200, POS (Point Of Sale) terminals 403-1 and 403-2, etc. connected to the branch power supply line (wiring) via a branch breaker, etc. from the distribution board 401). The maintenance monitoring apparatus 100 may perform disaggregation of the composite waveform and estimate a current waveform of the coffee vending machine 200 and the operation state. The communication apparatus 402 may be constituted by a SEMS (Store Energy Management System)/BEMS (Building Energy Management System) controller, for example.

In FIGS. 9 and 10, the maintenance monitoring apparatus 100 may be implemented on a cloud server or the like which is connected to the measurement apparatus 300 via a communication node(s) and a network (WAN (Wide Area Network) such as the Internet).

Example Embodiment 2

Figure 3:
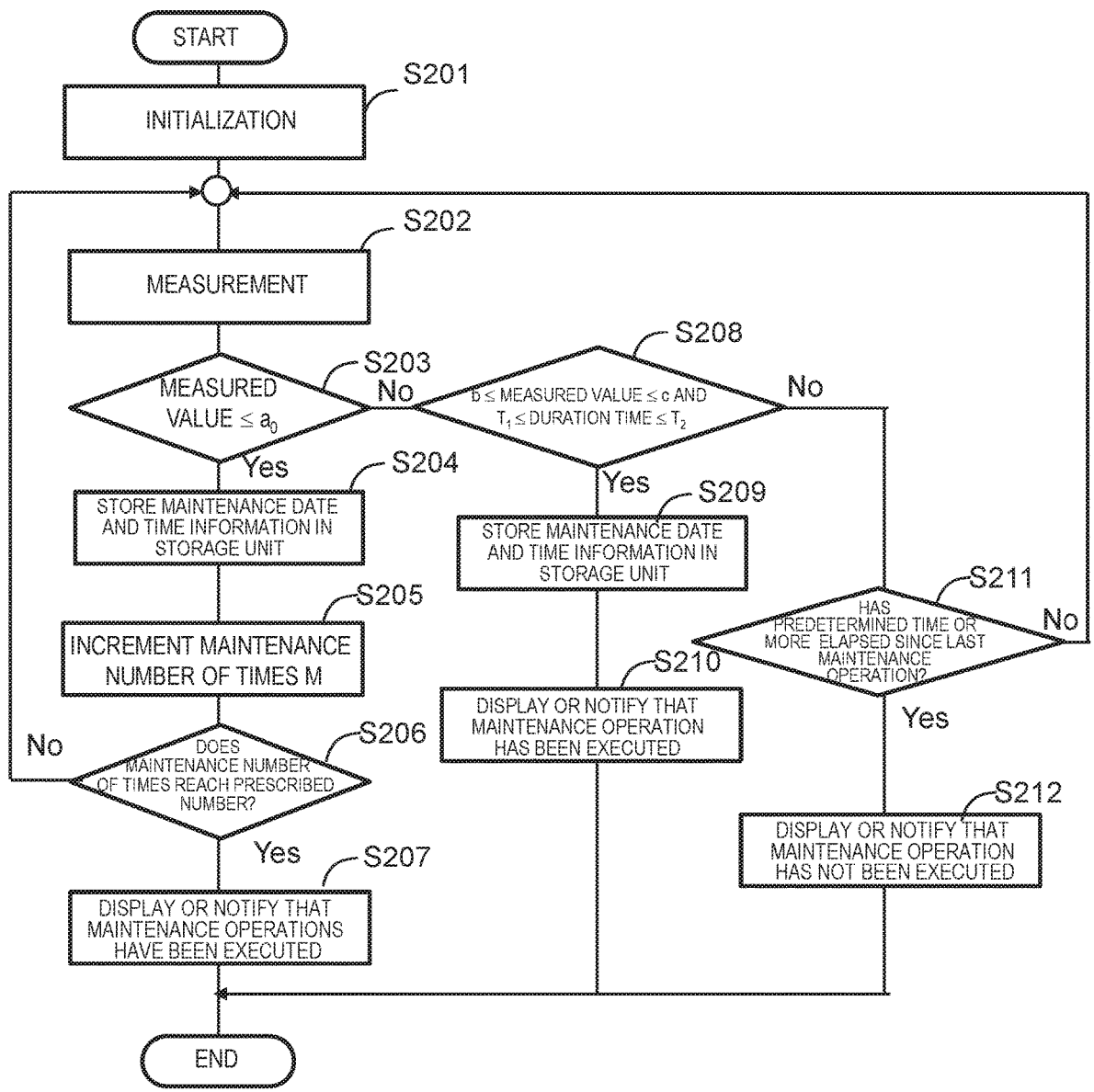
FIG. 3 is a flowchart illustrating an example of a processing procedure according to a second example embodiment of the present invention.

FIG. 3 illustrates a processing procedure according to a second example embodiment. The basic configuration according to the second example embodiment is the same as the basic configuration illustrated in FIG. 1. In the second example embodiment, whether a maintenance operation of the coffee vending machine is a manual-cleaning operation or not can be detected. The following description assumes that a first threshold value ($a_0$) compared with a measured value of current or power of the coffee vending machine is less than second and third threshold values (b and c) used for determination of manual-cleaning ($a_0<b<c$). Though not particularly limited thereto, in the second example embodiment, if time during when the measured value of the current or power is continuously greater than or equal to the second threshold value (b) and less than or equal to the third threshold value (c) is in a predetermined range, the manual-cleaning is determined. Steps S201-S202, S204-S207, S211, and S212 in FIG. 3 are the same as steps S101-S102, S104-S107, S108, and S109 in FIG. 2.

As illustrated in FIG. 3, the maintenance operation determination section 103 receives a measured value of power or current of the coffee vending machine measured by the measurement apparatus 300 and determines whether the measured value is less than or equal to the predetermined first threshold value ($a_0$) (step S203).

If the measured value is less than or equal to the predetermined first threshold value ($a_0$) (Yes in step S203), the maintenance date-and-time management section 104 stores corresponding maintenance date and time in the storage unit 105 (step S204). The maintenance number of times management section 106 increments the number of times M of executed maintenance operations (step S205). If the maintenance number of times M reaches a prescribed number per day (4, for example) (Yes in step S206), the maintenance execution determination section 108 determines that the maintenance has been executed, and the notification part 102 notifies that the maintenance has been executed (step S207). In contrast, if the maintenance number of times M does not reach the prescribed number (No in step S206), control is returned to step S202.

As a result of the determination by the maintenance operation determination section 103, if the measured value is greater than or equal to the first threshold value ($a_0$) (No in step S208), the maintenance operation determination section 103 determines whether a time period during which the measured value is greater than or equal to the second threshold value (b) and is less than or equal to the third threshold value (c) continues for a predetermined time period (greater than or equal to $T_1$ and less than or equal to $T_2$) (step S208).

For example, if the maintenance operation determination section 103 determines that the measured current value received from the measurement apparatus 300 is greater than or equal to the second threshold value (b) and is less than or equal to the third threshold value (c), the maintenance operation determination section 103 starts an internal timer not illustrated. At a next timing, the maintenance operation determination section 103 determines whether a measured current value received from the measurement apparatus 300 is greater than or equal to the second threshold value (b) and is less than or equal to the third threshold value (c). If the condition is met, the maintenance operation determination section 103 receives the measured current value from the measurement apparatus 300 at the next timing and determines whether the condition is met. If the maintenance operation determination section 103 detects that the measured current value received from the measurement apparatus 300 is not greater than or equal to the second threshold value (b) and less than or equal to the third threshold value (c) (namely, the measured current value is less than the second threshold value (b) or more than the third threshold value (c)), the maintenance operation determination section 103 may stop the timer at a timing of the detection. In this way, whether or not a time period T during which the measured value is less than or equal to the second threshold value (b) and greater than or equal to the third threshold value (c) is within the predetermined range ($T_1 \leq T \leq T_2$), may be determined. Alternatively, the maintenance operation determination section 103 may receive current waveform data sampled at a predetermined sampling rate by the measurement apparatus 300, analyze the current waveform data, and determine whether a time period during which the current value is continuously greater than or equal to the second threshold value (b) and less than or equal to the third threshold value (c) is within the predetermined range ($T_1 \leq T \leq T_2$).

Figure 11:
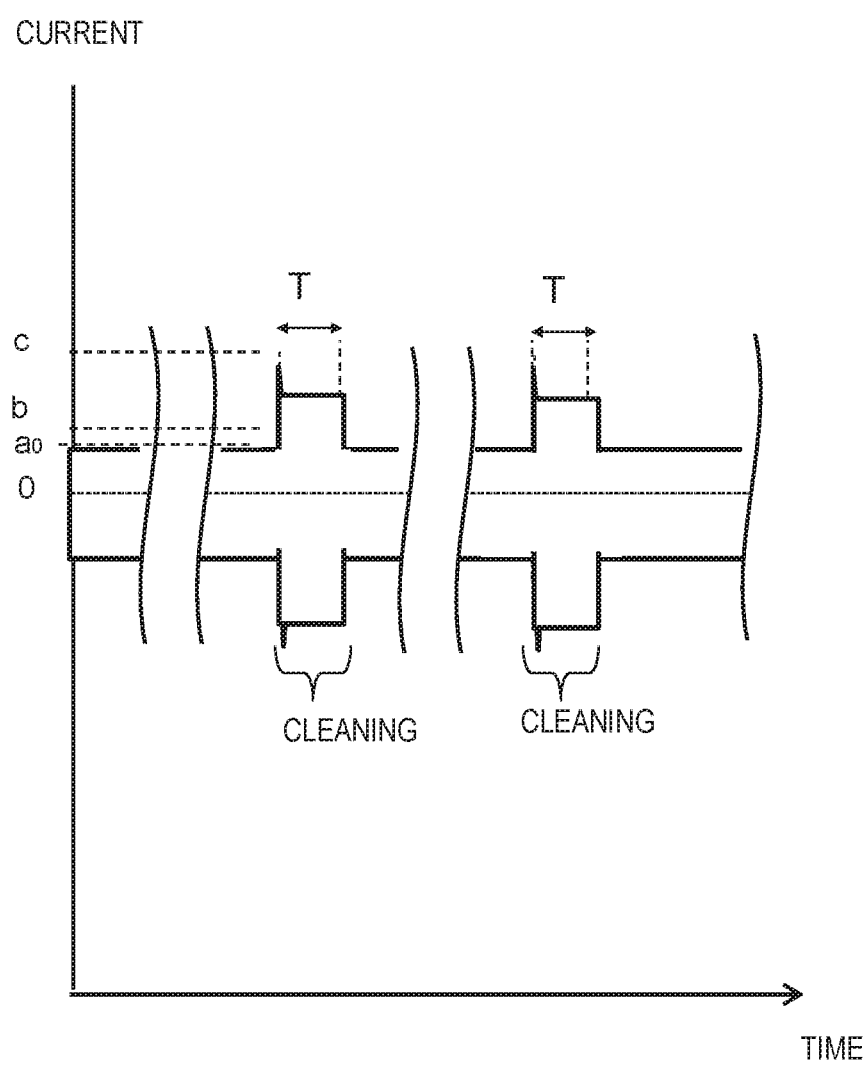
FIG. 11 is a diagram schematically illustrating an example of a waveform image of a processing operation (manual-cleaning) of a coffee vending machine.

FIG. 11 illustrates an example of manual rinse valve cleaning of the coffee vending machine 200. Hot water is injected by a rinse valve with a valve attached to an end of a hose from the hot water tank (210 in FIG. 17) of the coffee vending machine 200, to clean an inside of the brewer (205 in FIG. 17). When cleaning is performed by using the rinse valve, a certain amount of water is discharged, and water is supplied from the water supply tank (209 in FIG. 17). As illustrated as an example in FIG. 11, a case in which a time (period) T during which a measured value is greater than or equal to the second threshold b and less than or equal to the third threshold value c is greater than or equal to $T_1$ and less than or equal to $T_2$ corresponds to a case in which a period T during which cleaning in FIG. 11 (rinse valve cleaning) is performed is $T_1 \leq T \leq T_2$.

If the time T during which the measured current value is continuously greater than or equal to the second threshold b and less than or equal to the third threshold value c is within the predetermined range ($T_1 \leq T \leq T_2$) (Yes in step S208), the maintenance operation determination section 103 determines that the operation is a manual maintenance. The maintenance date-and-time management section 104 stores the manual-cleaning maintenance date and time in the storage unit 105 (step S209). Since the manual-cleaning maintenance operation has been performed once, which is the number of manual-cleaning maintenance operations designated per day, the maintenance number of times management section 106 displays or notifies, via the notification part 102, that the maintenance has been executed (completion of execution of the manual-cleaning maintenance) (step S210).

Figure 4:
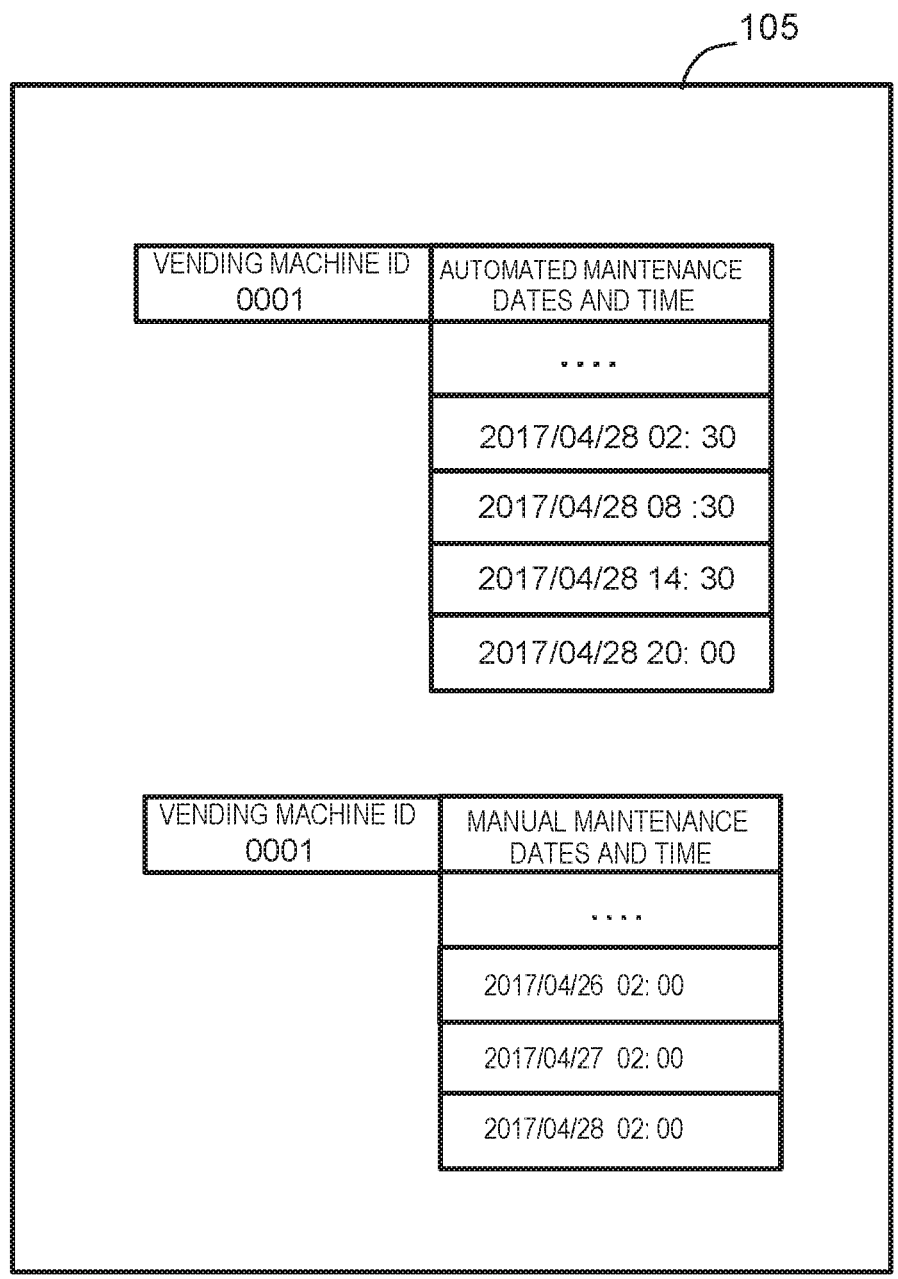
FIG. 4 illustrates an example of a content of a storage unit according to the second example embodiment of the present invention.

As illustrated as an example in FIG. 4, the maintenance date-and-time management section 104 may store manual-cleaning maintenance dates and time in the storage unit 105 in association with a corresponding vending machine ID, as a table separately from a table for the automated-maintenance dates and time.

If the measured current value is less than the second threshold b or more than the third threshold value c, or if the time during when the measured current value is greater than or equal to the second threshold b and less than or equal to the third threshold value c is less than $T_1$ or more than $T_2$, the maintenance operation determination section 103 determines that the operation is not a manual-cleaning maintenance operation (No in step S208). In this case, the maintenance interval management section 107 refers to current date and time and date and time of the last manual-cleaning maintenance operation stored in the storage unit 105 and determines whether a predetermined time or more has elapsed since the last maintenance operation (step S211). If the predetermined time or more has elapsed (Yes in step S211), the maintenance interval management section 107 notifies, via the notification part 102, that a maintenance has not been executed (that a regular maintenance operation that needs to be executed regularly per predetermined time has not been executed) (step S212). This notification may be displayed on an alarm lamp or the like of the corresponding vending machine. Alternatively, the notification may be given to an in-store management terminal or POS (Point Of Sale) register or a portable terminal of a person in charge, for example. If the predetermined time or more has not elapsed (No in step S211), control is returned to step S202, and the measurement by the measurement apparatus 300 is performed.

It is noted that in the processing for determining whether or not the predetermined time or more has elapsed since the last maintenance operation in step S211, an elapsed time and a predetermined time may be managed for each of the automated- and manual-cleaning maintenance operations. For example, in a case where a manual-cleaning maintenance operation is to be executed once per day, for example, if 24 hours or more has elapsed since the last maintenance operation, the maintenance interval management section 107 may notify that a manual-cleaning maintenance has not been executed. Alternatively, if no manual-cleaning maintenance has been executed within a day (for example, from 0 o'clock to 24 o'clock), the maintenance interval management section 107 may notify that a manual-cleaning maintenance has not been executed. In contrast, in a case where an automated-maintenance operation needs to be executed four times a day, if, for example, 6 hours or more has elapsed since the last maintenance operation, the maintenance interval management section 107 may notify that an automated-maintenance has not been executed.

In addition, for example, in a case where a manual-cleaning maintenance operation needs to be executed a plurality of times per day (a prescribed number of times), processing for incrementing the number of manual-cleaning maintenance operations and processing for comparing the number of manual-cleaning maintenance operations with a prescribed number may be performed, and if the number of manual-cleaning maintenance operations reaches a prescribed number, the maintenance interval management section 107 may notify, via the notification part 102, that the maintenance has been executed (that the manual-cleaning maintenance has been executed the prescribed number of times).

According to the second example embodiment, manual-cleaning can also be monitored, and the history thereof can be stored.

Example Embodiment 3

The configuration according to a third example embodiment of the present invention is the same as that illustrated in FIG. 1. However, processing of the maintenance operation determination section 103 according to the third example embodiment differs from that according to the first example embodiment. According to the first and second example embodiments, the maintenance operation determination section 103 determines whether an operation is a maintenance operation by comparing a measured value obtained by the measurement apparatus 300 with a threshold value. However, the maintenance operation determination section 103 may determine whether an operation is a maintenance operation by analyzing a pattern of a current or power waveform.

Figure 17:
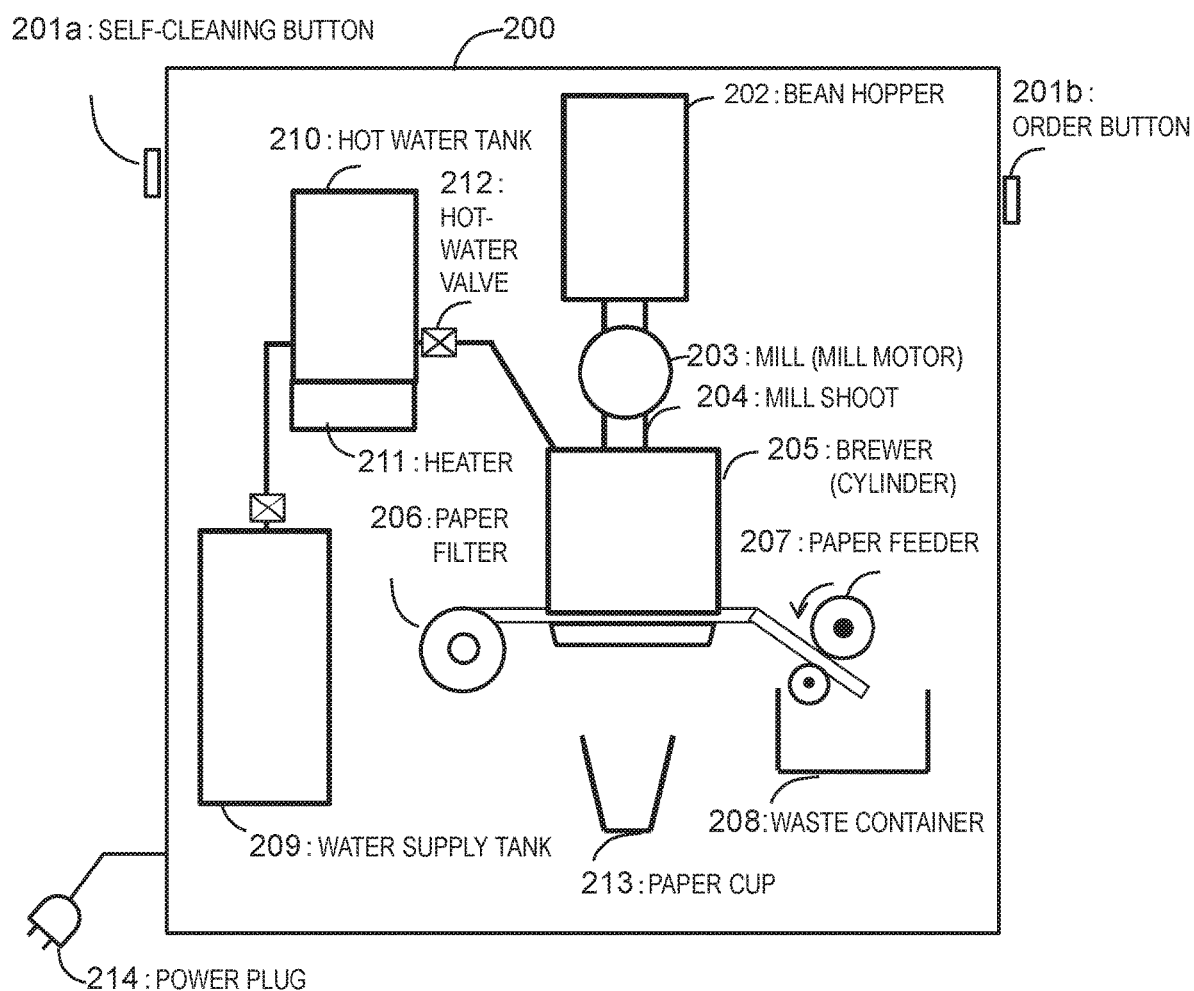
FIG. 17 is a diagram schematically illustrating a typical example of a coffee vending machine.

The coffee vending machine 200 executes an automated self-cleaning operation sequence in response to pressing of a self-cleaning button (for example, 201a in FIG. 17). In this case, the coffee vending machine 200 cleans a brewer by using a hot water flowing through a hot water supply route from the hot water tank and performing a coffee extraction process without beans. Thus, a current or power waveform of the automated cleaning operation of the coffee vending machine exhibits a unique time-series pattern based on the sequence.

The maintenance operation determination section 103 may match a current or power waveform acquired by the measurement apparatus 300 against a typical current or power waveform (a feature value (vector) extracted from the current or power waveform) that is stored in a storage unit or the like in advance and that corresponds to a maintenance operation. In this case, the maintenance operation determination section 103 may calculate, for example, a degree of similarity between waveform patterns or a degree of similarity between waveform feature values of operation sequences to determine whether the operation is a maintenance operation. For example, the maintenance operation determination section 103 of the maintenance monitoring apparatus 100 may store a group of feature values of current or power waveform of automated cleaning operation sequences (for example, the waveform feature values of the respective predetermined cycles of commercial power supply frequencies or statistical values of the waveform feature values) as a reference vector Y. In this case, for the currently acquired waveform pattern, the maintenance operation determination section 103 may calculate a feature value vector X of the current or power waveform of the operation sequence (for example, a hot-water rinse cleaning operation) and calculate a distance from the corresponding reference vector (similarity). If the distance is less than or equal to a predetermined value, the operation may be determined to be an automated cleaning operation. For example, clustering (unsupervised learning) or the like using Euclidean distance, cosine distance, Mahalanobis distance, etc. may be performed as a degree of similarity between feature value vectors of the current or power waveforms. A waveform shape (a waveform peak value, an average value, an effective value (a root mean square: RMS), a peak value, etc.) may be used as the feature value of the individual current or power waveform. Alternatively, using a fast Fourier transform, discrete Fourier transform, a short-time fast Fourier transform, a short-time discrete Fourier transform, or the like, a time domain signal is converted to a frequency domain and a value obtained as a result of an operation such as square addition of an amplitude of a frequency spectrum component may be used as a feature value.

Example Embodiment 4

Figure 5:
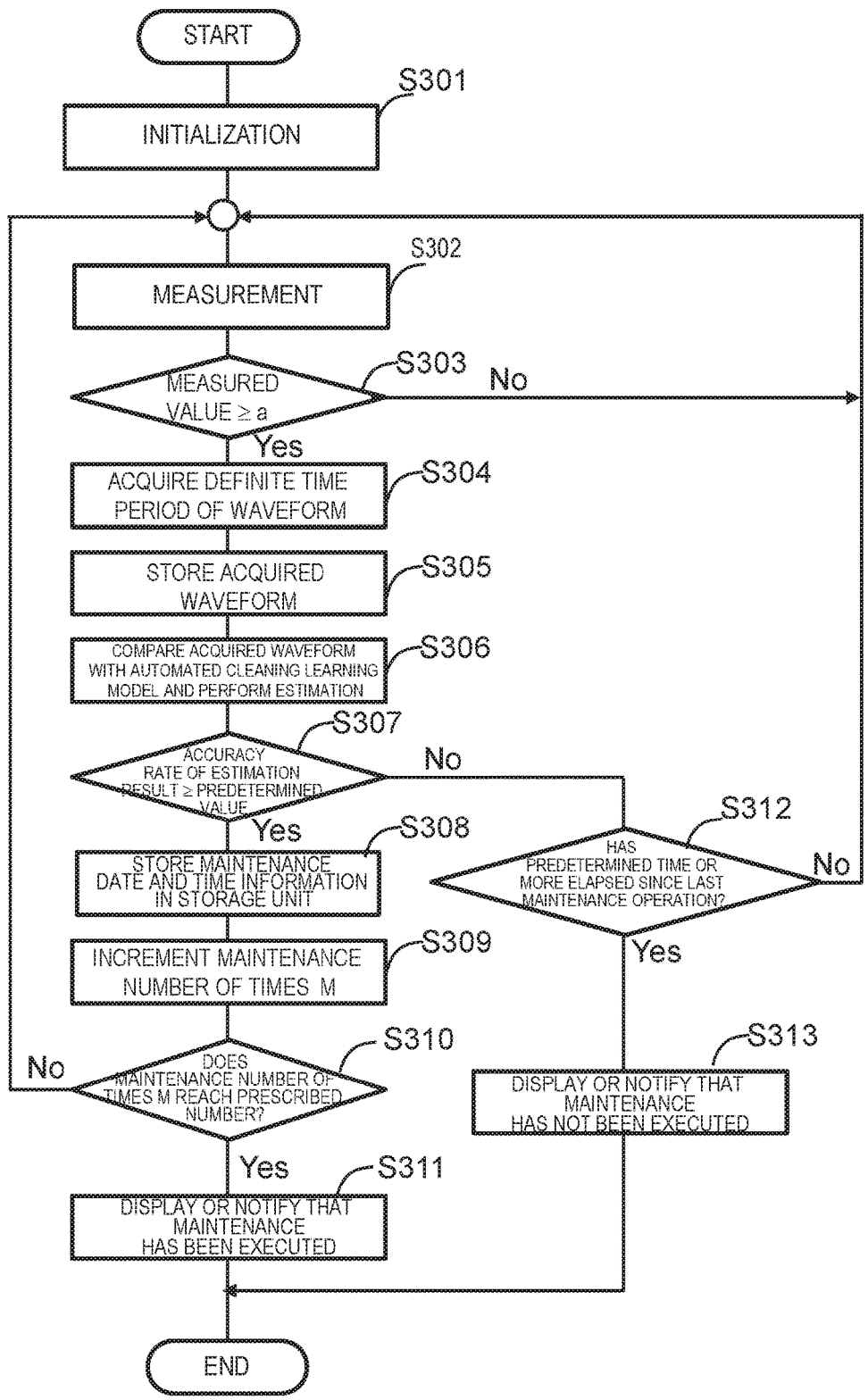
FIG. 5 is a flowchart illustrating an example of a processing procedure according to a fourth example embodiment of the present invention.

A fourth example embodiment of the present invention describes an example in which a classifier is constituted by using supervised learning and identification as to whether an acquired current or power waveform is a maintenance operation is performed. The configuration according to the fourth example embodiment of the present invention is the same as that illustrated in FIG. 1. The processing of the maintenance operation determination section 103 according to the fourth example embodiment differs from that according to the above first example embodiment. FIG. 5 illustrates a processing procedure according to the fourth example embodiment of the present invention. According to the fourth example embodiment, the maintenance operation determination section 103 determines whether an operation is an automated cleaning maintenance operation of the coffee vending machine by using, for example, an accuracy of an estimation result (a rate of the estimation result being a correct answer) based on a supervised learning model.

The maintenance operation determination section 103 generates learning models in advance by learning a feature value (vector) of a current or power waveform of the automated cleaning operation of the coffee vending machine and an operation sequence (correct label) as learning data. The maintenance operation determination section 103 compares a feature value (vector) of a definite time period of a current or power waveform acquired from the measurement apparatus 300 with the learning model learned in advance. If the accuracy of the estimation result is greater than or equal to a predetermined value, the maintenance operation determination section 103 determines that the operation is a maintenance operation. For example, the maintenance operation determination section 103 performs learning based on training examples formed by a set of inputs and outputs and predicts an output with respect to an input (a feature value vector of a current or power waveform), wherein the input is a maintenance operation (a positive class) or not (a negative class) is unknown. In the learning, for example, supervised learning may be performed by using a feature value vector of a power or current waveform at the time when automated cleaning is performed, as a positive example, and a classifier (discriminator) may be constituted. A support vector machine (SVM), a naive Bayes classifier, a decision tree, a random forest, or the like may be used as a classifier (discriminator) of 2 classes (a positive class and a negative class). Alternatively, a decision tree may be constituted by using time-series of an operation sequence corresponding to a current or power waveform (time-series of a waveform feature value) as a correct label, and whether an operation is a maintenance operation may be determined by applying the decision tree to a current or power waveform (time-series of a waveform feature value) acquired from the measurement apparatus 300. A waveform shape (a waveform peak value, an average value, an RMS value, a peak value, etc.) may be used as the feature value of the individual current or power waveform. Alternatively, using a fast Fourier transform, discrete Fourier transform, a short-time fast Fourier transform, a short-time discrete Fourier transform, or the like, a time domain signal is converted to a frequency domain and a value obtained as a result of an operation such as square addition of an amplitude of a frequency spectrum component may be used as a feature value.

In FIG. 5, steps S301, S302, S303, and S305 may correspond to S101, S102, S103, and S104 in FIG. 2.

If the measured value of the current or power measured by the measurement apparatus 300 is greater than or equal to the threshold value a (Yes in step S303), the maintenance operation determination section 103 acquires a definite time period of the current or power waveform from the measurement apparatus 300 (step S304) and stores the acquired waveform (step S305).

The maintenance operation determination section 103 acquires the definite time period of the current or power waveform from the measurement apparatus 300, compares the waveform with a learning model of a current or power waveform of an automated cleaning operation, to perform estimation (step S306). If the estimation result indicates a desired accuracy or more, the maintenance operation determination section 103 determines that the operation is an automated cleaning maintenance operation (Yes in step S307). Namely, if an accuracy is greater than or equal to a predetermined value, the maintenance operation determination section 103 determines that the operation is an automated cleaning maintenance operation (Yes in step S307), wherein the accuracy is a rate of a result of the estimation for the acquired definite time period of the current or power waveform based on the learning model matching with the automated cleaning learning waveform.

The maintenance date-and-time management section 104 stores the maintenance date and time in the storage unit 105 (step S308). The maintenance number of times management section 106 increments the maintenance number of times M (step S309). If the maintenance number of times M reaches a predetermined prescribed number (Yes in step S310), the maintenance execution determination section 108 determines that the maintenance has been executed, and the notification part 102 notifies that the maintenance has been executed.

If the maintenance number of times M does not reach the prescribed value (No in step S310), the maintenance number of times management section 106 returns control to step S302.

If the accuracy is less than or equal to the predetermined value (No in step S307), the maintenance operation determination section 103 determines that the operation is not an automated cleaning maintenance operation and returns control to the maintenance interval management section 107. The maintenance interval management section 107 refers to the date and time of the last manual-cleaning maintenance operation stored in the storage unit 105 and determines whether a predetermined time or more has elapsed since the last maintenance operation (step S312). If the predetermined time or more has elapsed (Yes in step S312), the maintenance interval management section 107 notifies, via the notification part 102, that a maintenance has not been executed (step S313).

The maintenance operation determination section 103 returns control to step S302 if the measured value of the current or power obtained by the measurement apparatus 300 is less than the threshold value a (No in step S303).

If an alarm goes up even when an automated cleaning maintenance has been executed, there could be a problem with the automated cleaning maintenance operation. However, the present example embodiment enables early detection of such problem and contributes to risk reduction.

Example Embodiment 5

Figure 6:
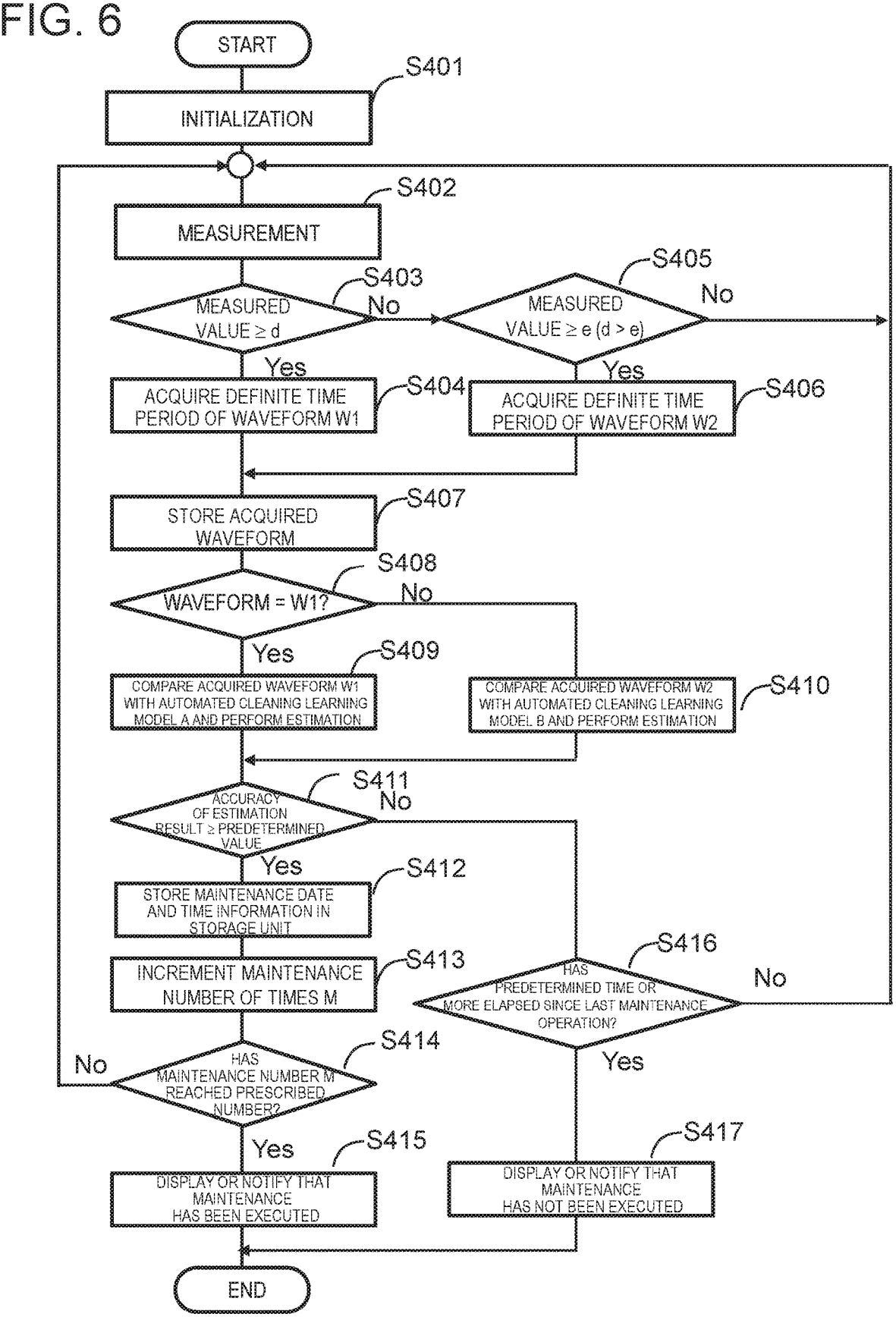
FIG. 6 is a flowchart illustrating an example of a processing procedure according to a fifth example embodiment of the present invention.

FIG. 6 illustrates a processing procedure according to a fifth example embodiment of the present invention. The configuration according to the fifth example embodiment of the present invention is the same as that illustrated in FIG. 1. However, the processing of the maintenance operation determination section 103 according to the fifth example embodiment differs from that according to the fourth example embodiment.

Regarding a hot beverage, a heater (for example, 211 in FIG. 17) for heating and maintaining temperature of a hot water in a hot water tank (for example, 210 in FIG. 17) of the coffee vending machine 200 operates. Thus, according to the fifth example embodiment, a current or power waveform corresponding to when the heater in the coffee vending machine 200 operates is learned in advance. In FIG. 6, steps S401-S402, S404, S407, S409, and S411-S415 may correspond respectively to steps S301-S302, S304, S305, and S306-S311 in FIG. 5.

The maintenance operation determination section 103 determines whether a measured value of current or power obtained by the measurement apparatus 300 is greater than or equal to a fourth threshold value d. If the measured value of the current or power is greater than or equal to the fourth threshold value d, the maintenance operation determination section 103 determines that the operation is a maintenance operation associated with a heating operation of the heater (for example, 211 in FIG. 17) (Yes in step S403), acquires a definite time period of a current or power waveform w1 of the coffee vending machine from the measurement apparatus 300, and stores the waveform w1 (step S404).

If the measured value of the current or power is less than or equal to the fourth threshold value d (No in step S403), the maintenance operation determination section 103 determines whether the measured value of the current or power is greater than or equal to a fifth threshold e (step S405). If the measured value of the current or power is greater than or equal to the fifth threshold value e (Yes in step S405), the maintenance operation determination section 103 acquires a definite time period of a current or power waveform w2 of the coffee vending machine from the measurement apparatus 300 (step S406) and stores the waveform w2 (step S407). If the measured value of the current or power is less than the fifth threshold value e (No in step S405), the maintenance operation determination section 103 returns control to step S402.

If the acquired waveform is w1 (Yes in step S408), the maintenance operation determination section 103 compares the acquired waveform with an automated cleaning learning model A (with the heater) and performs an estimation operation (step S409). If the accuracy is greater than or equal to a predetermined value (Yes in step S411), the maintenance operation determination section 103 determines that the operation is an automated cleaning maintenance operation, and the maintenance date-and-time management section 104 stores the maintenance date and time in the storage unit 105 (step S412).

The maintenance number of times management section 106 increments the maintenance number of times M (step S413). If the maintenance number of times M reaches a prescribed number (Yes in step S414), the maintenance execution determination section 108 determines that the maintenance has been executed, and the notification part 102 notifies that the maintenance has been executed.

In step S408, if the acquired current or power waveform is w2 (No in step S408), the maintenance operation determination section 103 compares the acquired waveform w2 with an automated cleaning learning model B (without a heater operation) (step S410).

If, as a result of the comparison between the power or current waveform and the corresponding learning model in step S409 or 410, the accuracy is greater than or equal to the predetermined value (Yes in step S411), the maintenance operation determination section 103 determines that the operation is an automated cleaning maintenance operation.

The maintenance date-and-time management section 104 stores the maintenance date and time in the storage unit 105 (step S412). The maintenance number of times management section 106 increments the maintenance number of times M (step S413). If the maintenance number of times M reaches the prescribed number (Yes in step S414), the maintenance execution determination section 108 determines that the maintenance has been executed, and the notification part 102 notifies that the maintenance has been executed.

As a result of the comparison between the waveform w1 or w2 acquired from the measurement apparatus 300 and the automated cleaning learning model A (with a heater operation) and learning model B (without a heater operation) (the result in step S409 or S410), if the corresponding accuracy is less than the corresponding predetermined value (No in step S411), the maintenance operation determination section 103 determines that the operation is not an automated cleaning operation, and transitions to step S416.

In step S416, the maintenance interval management section 107 determines whether a predetermined time or more has elapsed since the last maintenance operation by referring to the maintenance date and time in the storage unit 105. If the predetermined time or more has not yet elapsed (No in step S416), the maintenance interval management section 107 returns control to step S402.

If the predetermined time or more has elapsed (Yes in step S416), the maintenance interval management section 107 notifies, via the notification part 102, that a maintenance has not been executed (step S417).

It is noted that in the example in FIG. 6, the maintenance operation determination section 103 compares the measured value of the current or power obtained by the measurement apparatus 300 with the fourth threshold d and determines whether the heater (for example, 211 in FIG. 17) of the coffee vending machine 200 has operated. Namely, if the measured value of the current or power is greater than or equal to the fourth threshold value d, the maintenance operation determination section 103 determines that the coffee vending machine 200 has executed a maintenance operation accompanied with a heater operation (Yes in step S403).

Figure 12A:
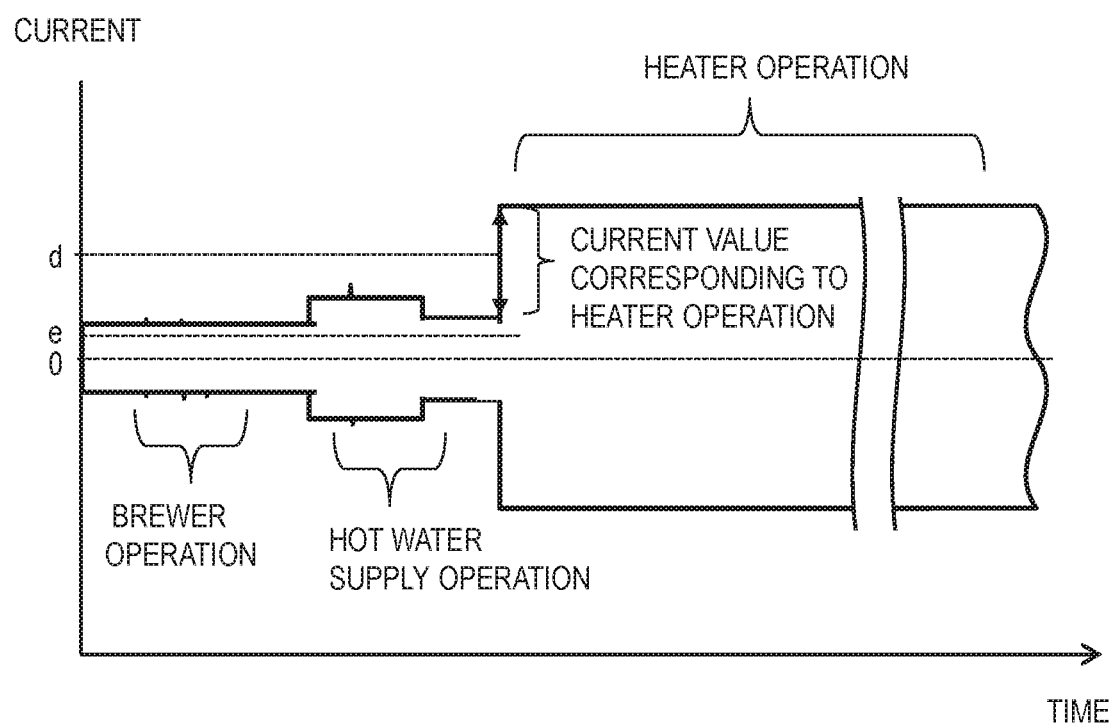
FIG. 12A is a diagram schematically illustrating an example of a waveform image (with a heater operation) of a processing operation (automated cleaning) of a coffee vending machine.
Figure 12B:
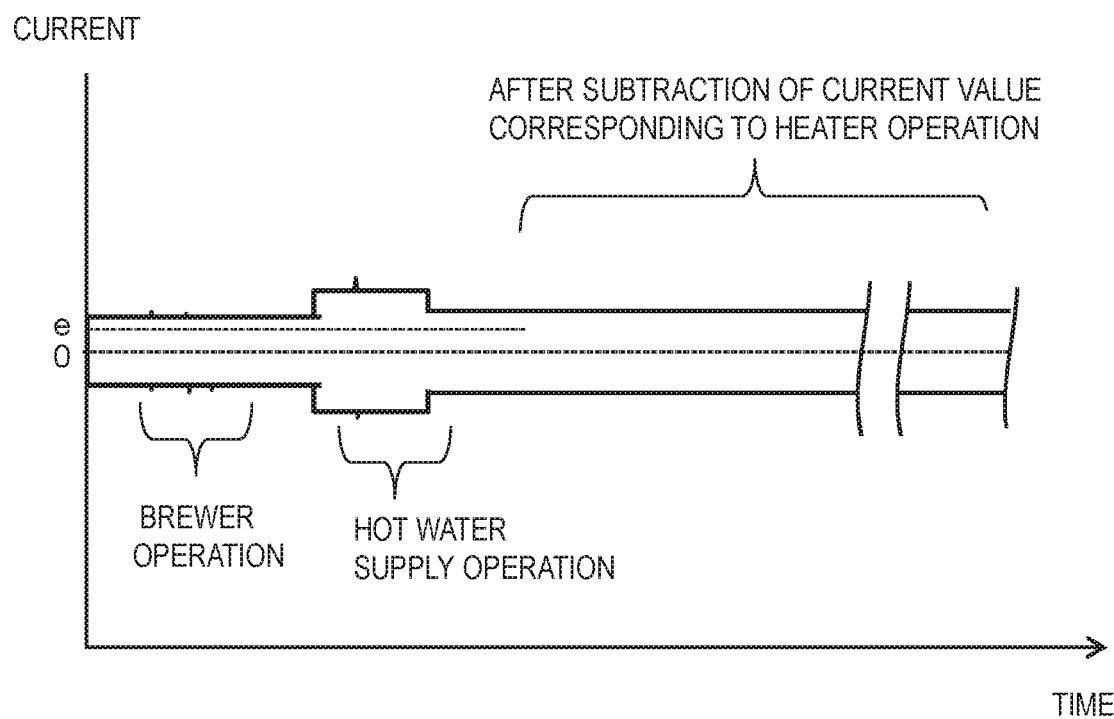
FIG. 12B is a diagram schematically illustrating an example of a waveform image (a waveform without a heater operation) of a processing operation (automated cleaning) of a coffee vending machine.

However, as schematically illustrated in FIGS. 12A and 12B, preprocessing for subtracting a current value corresponding to the heater operation from the current or power waveform acquired from the measurement apparatus 300 may be performed. Regarding the current waveform of the automated cleaning maintenance operation of the coffee vending machine 200, FIG. 12B illustrates an example of a waveform (without a heater operation) obtained by subtracting the current value corresponding to the heater operation from the waveform (the waveform corresponding to when the heater operation is performed) in FIG. 12A. The maintenance operation determination section 103 may determine whether the operation is a maintenance operation by using this waveform (FIG. 12B) obtained by subtracting the current value corresponding to the heater operation.

Alternatively, disaggregation or the like may be performed on a current or power waveform acquired from the measurement apparatus 300. In this case, a state with a heater operation and a state without a heater operation are separated, and whether the operation is a maintenance operation may be determined on a waveform without the heater operation.

The fifth example embodiment enables monitoring even when the vending machine provides a hot beverage which needs a heater operation to keep temperature of hot water or executes a maintenance operation needing hot water.

Example Embodiment 6

Figure 7:
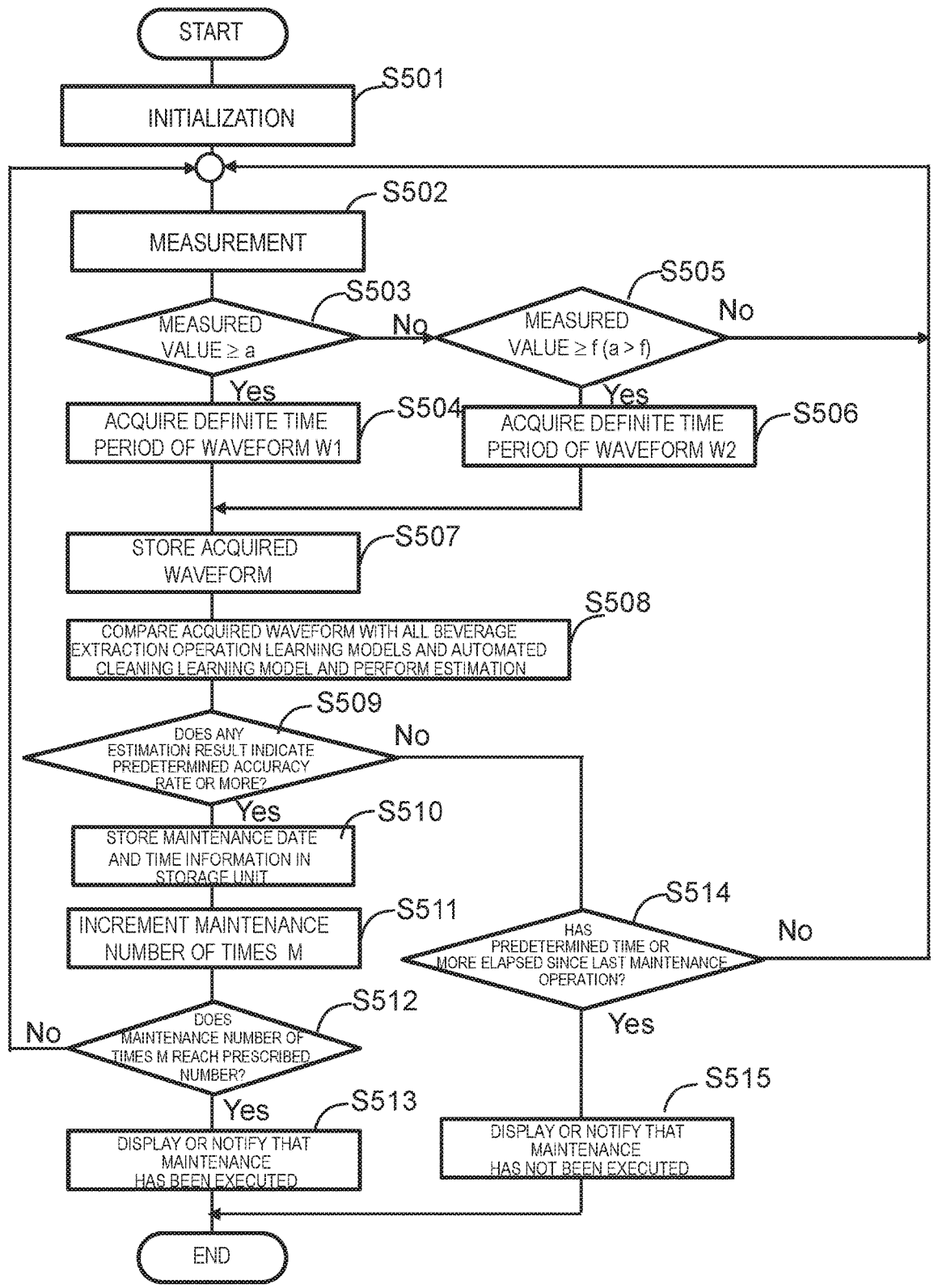
FIG. 7 is a flowchart illustrating an example of a processing procedure according to a sixth example embodiment of the present invention.
Figure 13:
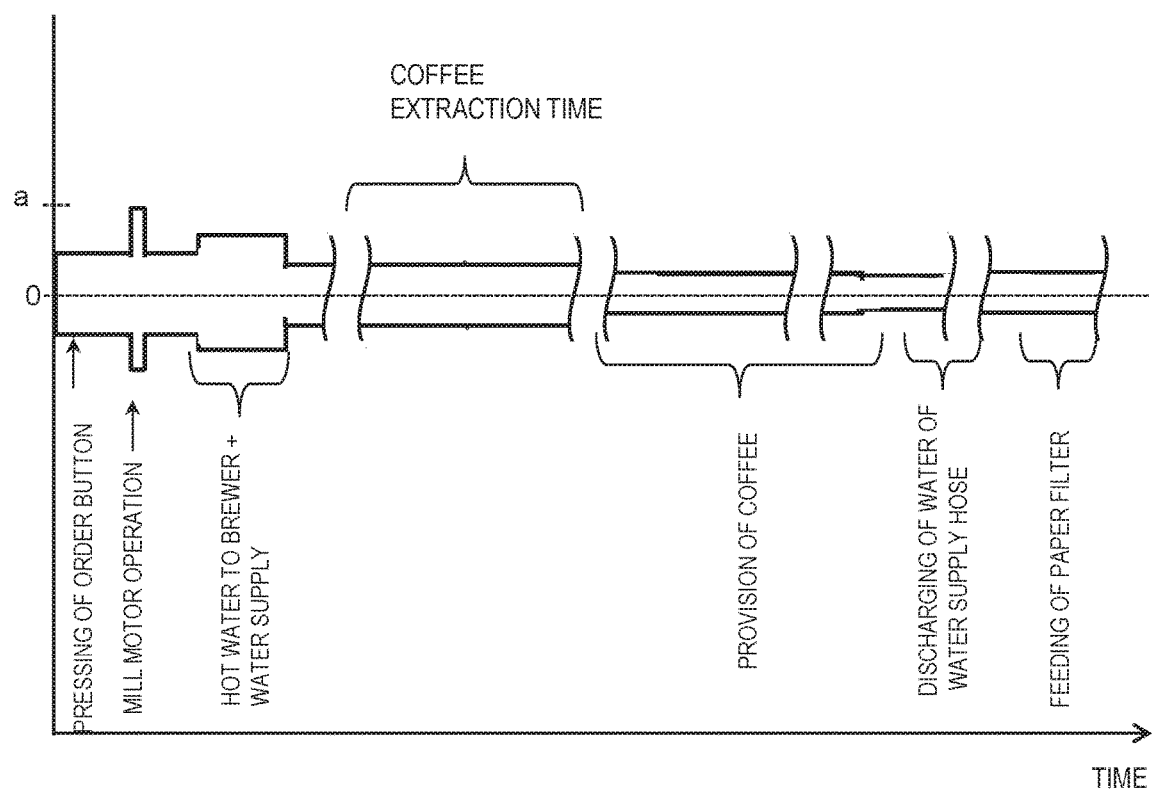
FIG. 13 is a diagram schematically illustrating an example of a waveform image of a processing operation (coffee extraction) of a coffee vending machine.

FIG. 7 illustrates a processing procedure according to a sixth example embodiment of the present invention. Depending on a type or model of a coffee vending machine, there is a case in which a coffee extraction operation and an automated cleaning (maintenance) operation are similar to each other. According to the sixth example embodiment, a waveform (for example, FIGS. 12A, 12B, etc.) of an automated cleaning operation sequence and a waveform (for example, FIG. 13) of all expected operation sequences at a time when coffee is provided are learned in advance. FIG. 13 schematically illustrates an example of a current waveform of operation sequences including: pressing of an order button (201b in FIG. 17), operation of a mill motor, extraction of coffee, and feeding of a paper filter. The waveform of the operation sequences used when coffee is provided may include a waveform corresponding to when a heater operates (when a hot water tank is heated, for example). While not particularly limited, as supervised learning of the current waveform of the operation sequences when coffee is provided, training data of an individual feature value vector (m1, m2, m3, . . . ) of a predetermined length of time interval of a current waveform (or a power waveform) at individual timings of the operation sequences and individual correct labels (L1: pressing of the order button, L2: the operation of the mill motor, L3: the extraction of coffee, . . . ) corresponding to individual timings may be learned to perform modeling, thus creating a learning model on a current (power) waveform corresponding to a time when coffee is provided. A learning model may also be created in the same way for a waveform of an automated cleaning operation sequence.

If the measured value of the current or power measured by the measurement apparatus 300 is a predetermined threshold value a (which may be the same as the threshold value a in FIG. 2), the maintenance operation determination section 103 acquires a definite time period of the current or power waveform w1 from the measurement apparatus 300. If the measured value of the current or power from the measurement apparatus 300 is less than the threshold value a but is greater than or equal to another predetermined threshold value (a>f), the maintenance operation determination section 103 acquires a definite time period of the current or power waveform w2 from the measurement apparatus 300. Next, the maintenance operation determination section 103 compares the acquired waveform w1 or w2 with the automated cleaning operation learning model and the coffee extraction operation learning model and performs an estimation operation (for example, predicts labels by applying the waveform to the learning models). If at least one estimation result is greater than or equal to a predetermined accuracy (for example, if the rate at which the individual predicted label matches the individual correct label is greater than or equal to a predetermined value), the maintenance operation determination section 103 determines that the operation is a maintenance operation. If there is no estimation result that has achieved the predetermined accuracy or more, the maintenance operation determination section 103 determines that the operation is not a maintenance operation (an automated cleaning maintenance operation).

Steps S501 to S507 in FIG. 7 may correspond to steps S401 to S407 in FIG. 6, and steps S510 to S515 in FIG. 7 may correspond to steps S412 to S417 in FIG. 6.

If the measured value of the current or power of the coffee vending machine from the measurement apparatus 300 is greater than or equal to the threshold value a (Yes in step S503), the maintenance operation determination section 103 acquires a definite time period of the current or power waveform w1 from the measurement apparatus 300 (step S504). In contrast, if the measured value of the current or power from the measurement apparatus 300 is less than the threshold value a (No in step S503), the maintenance operation determination section 103 determines whether the measured value of the current or power is greater than or equal to the threshold value (a>f) in step S505.

If the measured value of the current or power is less than the threshold value (No in step S505), control is returned to step S502.

If the measured value of the current or power is greater than or equal to the threshold value f (a>f) (Yes in step S505), the maintenance operation determination section 103 acquires a definite time period of the current or power waveform w2 of the coffee vending machine via the measurement apparatus 300 (step S506). Next, the maintenance operation determination section 103 stores the acquired waveform (step S507).

The maintenance operation determination section 103 compares the definite time period of the waveform w1 or w2 of the current or power with the learning models of the automated cleaning operation and the coffee extraction operation and performs an estimation operation (step S508). If an accuracy of at least one estimation result is greater than or equal to the predetermined value, the maintenance operation determination section 103 determines that the operation is a maintenance operation (Yes in step S509).

As a result of the comparison between the acquired current waveform w1 or w2 and the learning models of the automated cleaning operation and the coffee extraction operation, if there is no accuracy greater than or equal to the predetermined value, the maintenance operation determination section 103 determines that the operation is not a maintenance operation (No in step S509).

According to the above sixth example embodiment, even when the coffee extraction operation and the automated cleaning (maintenance) operation are similar to each other, the maintenance operations of the coffee vending machine can be monitored.

Example Embodiment 7

Figure 8:
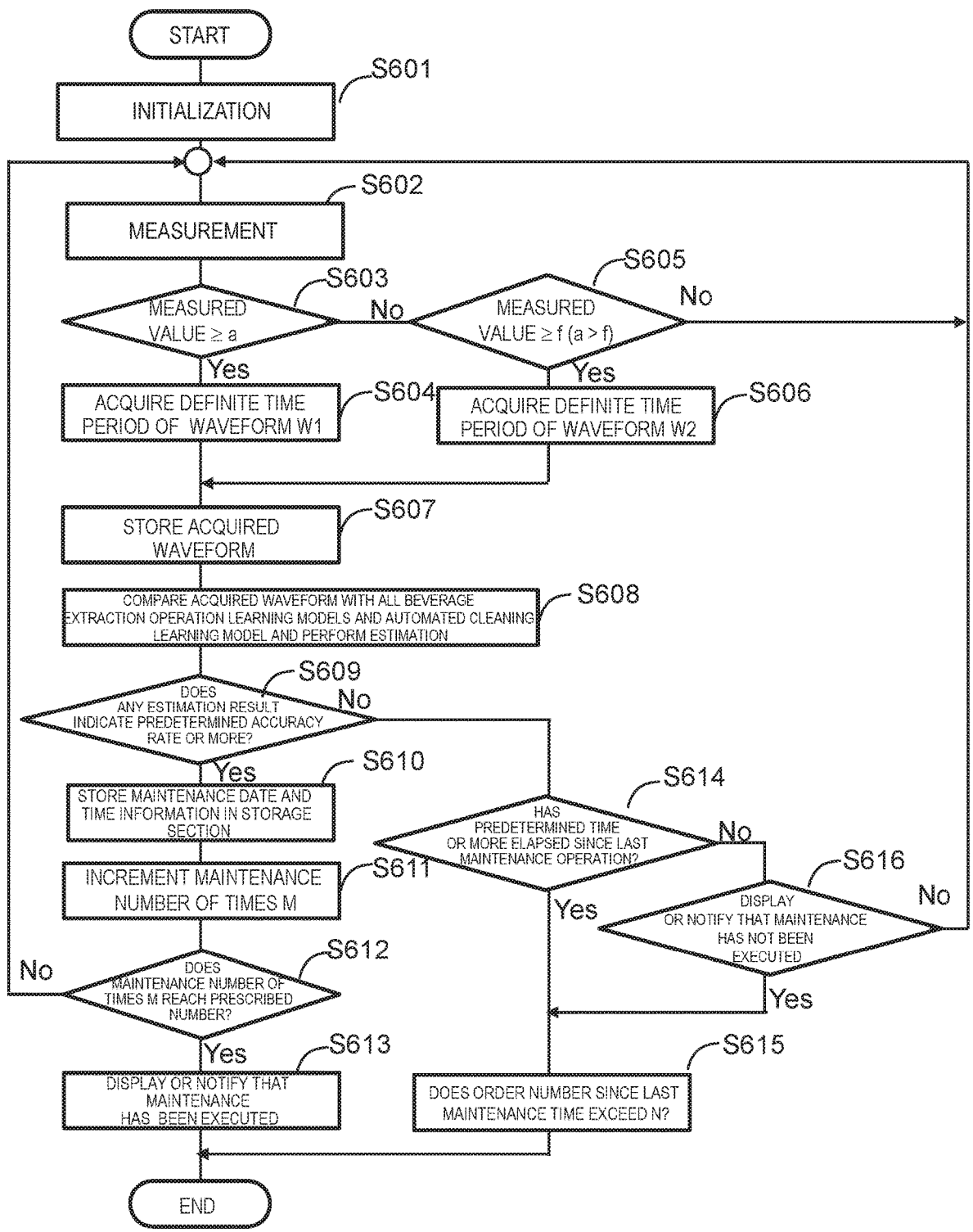
FIG. 8 is a flowchart illustrating an example of a processing procedure according to a seventh example embodiment of the present invention.

FIG. 8 illustrates a processing procedure according to a seventh example embodiment of the present invention. The number of sales of coffee per hour changes, for example, depending on a weather. In a convenience store, sales number dynamically changes, for example, depending on a campaign or introduction of new products. According to the present example embodiment, the maintenance monitoring apparatus 100 monitors a maintenance status in view of not only a maintenance execution interval (an elapsed time) but also the number of sales (the number of orders) of coffee. In FIG. 8, steps S601 to S615 are the same as steps S501 to S515 in FIG. 7. In the present example embodiment, step S616 is newly added.

The maintenance operation determination section 103 compares the acquired waveform with all coffee extraction operation learning models and automated cleaning operation learning model and obtains an estimation result (step S608). If none of the estimation result achieves an accuracy greater than or equal to a predetermined accuracy (No in step S609), the maintenance operation determination section 103 determines that the operation is not a maintenance operation (an automated cleaning maintenance operation).

In step S614, the maintenance interval management section 107 determines whether a predetermined time or more has elapsed since the last maintenance operation, based on a current time of a clock (system clock) (not illustrated) included in the maintenance monitoring apparatus 100 and the last maintenance date and time stored in the storage unit 105.

If the predetermined time or more has elapsed (Yes in step S614), the notification part 102 displays or notifies that a maintenance has not been executed (step S615).

If the predetermined time or more has not yet elapsed (No in step S614), the maintenance management part 101 determines whether the coffee sales number has exceeded a predetermined value N since the last maintenance operation (step S616).

If the coffee sales number (the order number) has exceeded the predetermined value N since the last maintenance operation (Yes in step S616), the notification part 102 displays or notifies that a maintenance has not been executed (step S615). Each time the maintenance monitoring apparatus 100 detects a coffee extraction operation based on a current or power value (a waveform) of the coffee vending machine 200 acquired from the measurement apparatus 300, the maintenance monitoring apparatus 100 may increment its internal coffee order number counter (not illustrated). Alternatively, each time the order button (201b in FIG. 17) of the coffee vending machine 200 is pressed, the maintenance monitoring apparatus 100 may acquire the pressing information from the coffee vending machine 200 and increment its internal coffee order number counter (not illustrated). Alternatively, the maintenance monitoring apparatus 100 may issue a query, for example, to a management server that manages sales results of a store to obtain information on the coffee sales number (order number) of the coffee vending machine 200.

If the coffee sales number has not exceeded the predetermined value N since the last maintenance operation (No in step S616), control is retuned to step S602.

The maintenance management part 101 (the maintenance interval management section 107) may change a time interval at which the next maintenance operation needs to be executed after the last maintenance operation, based on the coffee sales number. Assuming that the maintenance interval management section 107 normally monitors whether a maintenance operation is executed every four hours, if the coffee sales number exceeds a preset upper limit, the maintenance management part 101 may monitor whether a maintenance has been executed at a time interval (for example, a three-hour interval) set to be shorter than a four-hour interval. In contrast, if the coffee sales number falls below a preset lower limit, the maintenance management part 101 may monitor whether a maintenance operation is executed at a time interval (for example, a five-hour interval) which is longer than the four-hour interval.

The seventh example embodiment is applicable to a case in which a maintenance operation is executed in view of a coffee sales number (an order number).

In the seventh example embodiment, an example in which execution of maintenance operations is monitored in view of a coffee sales number (an order number) has been described. However, execution of the maintenance operations may be monitored in view of not only the sales number but also temperature, humidity, years of use of a vending machine, etc. (in view of at least one or any combination thereof). In this case, in the determination in step S616 in FIG. 8, the maintenance management part 101 may display or notify that a maintenance has not been executed in view of not only the coffee sales number (the order number) since the last maintenance time but also whether each of temperature, humidity, years of use of the vending machine, etc. has exceeded a predetermined value or not. Various modifications can be made to this control processing. For example, even when the sales number (order number) is less than or equal to the predetermined value, if temperature, humidity, or the like has exceeded a preset value, the maintenance management part 101 may display or notify that a maintenance has not been executed. Alternatively, if a sales number (order number) is greater than or equal to the previously set value and if the temperature, the humidity, or the like has exceeded a preset value, the maintenance management part 101 may display or notify that a maintenance has not been executed. Alternatively, for example, the time interval at which the next maintenance needs to be executed after the last maintenance operation may be changed based on temperature, humidity, years of use of the vending machine, etc. (based on at least one or any combination thereof), other than a coffee sales number. For example, if at least one or any combination of temperature, humidity, years of use of the vending machine, etc. is greater than or equal to a predetermined upper limit, the maintenance execution time intervals may be shortened.

Eighth Example Embodiment

Figure 14:
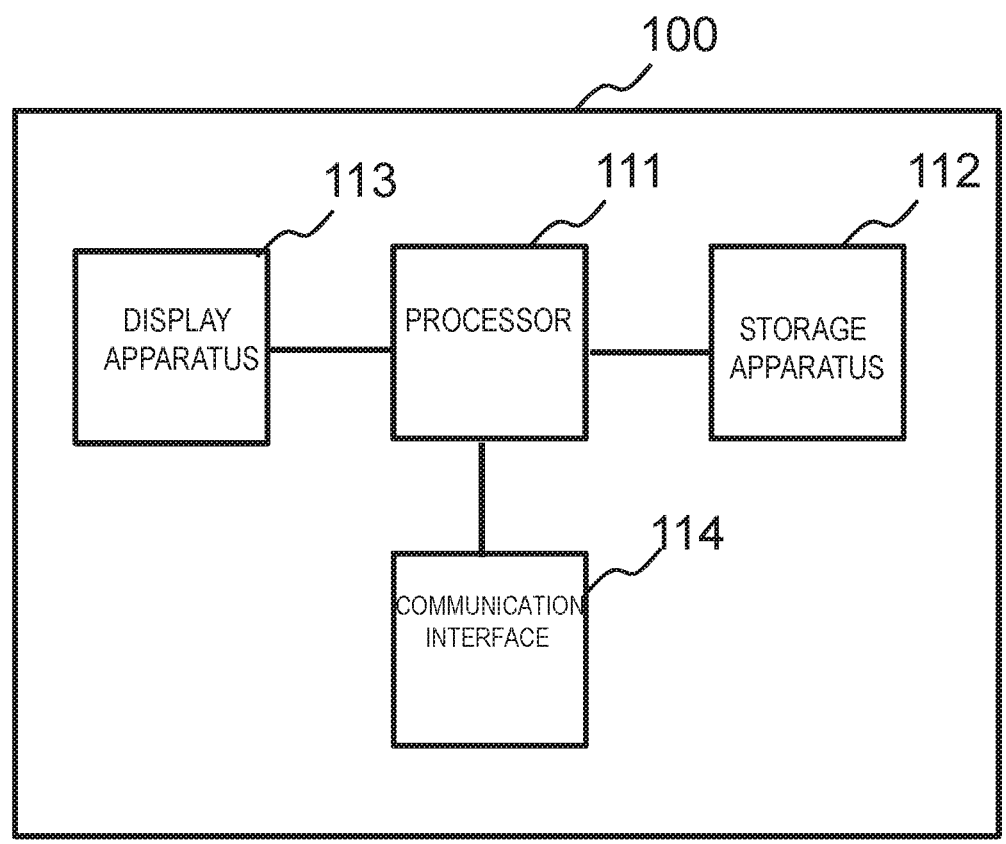
FIG. 14 is a diagram illustrating a configuration according to an eighth example embodiment of the present invention.

FIG. 14 illustrates, as an eighth example embodiment of the present invention, an example of a configuration in which the maintenance monitoring apparatus 100 described with reference to FIG. 1 is implemented in a computer system. As illustrated in FIG. 14, the maintenance monitoring apparatus 100 constituted by a computer such as a server computer includes: a processor (a CPU (a central processing unit), a data processing device) 111, a storage apparatus 112 that includes at least one of a semiconductor memory (for example, a RAM (a random access memory), a ROM (a read-only memory), an EEPROM (an electrically erasable and programmable ROM), etc.), an HDD (a hard disk drive), a CD (a compact disc), a DVD (a digital versatile disc), etc., a display apparatus 113, and a communication interface 114. The communication interface 114 may be configured to serve as the communication unit 109 in FIG. 9 or 10. The notification part 102 in FIG. 1 may be configured to output a determination result to the display apparatus 113, for example. The storage device 112 may be the same as the storage unit 105 in FIG. 1 or the buffer memory (the storage unit) in FIG. 9 or 10. The maintenance monitoring apparatus 100 according to the individual example embodiments described above may be realized by storing a program that realizes the functions of the maintenance monitoring apparatus 100 in FIG. 1 in the storage device 112 and causing the processor 111 to read and execute the program. The maintenance monitoring apparatus 100 (the computer) may be implemented in a SEMS controller or the like that manages the in-store power consumption. Alternatively, the maintenance monitoring apparatus 100 (the computer) may be implemented as a cloud server that provides a client(s) with the maintenance monitoring service of the coffee vending machine as a cloud service.

Ninth Example Embodiment

Figure 15:
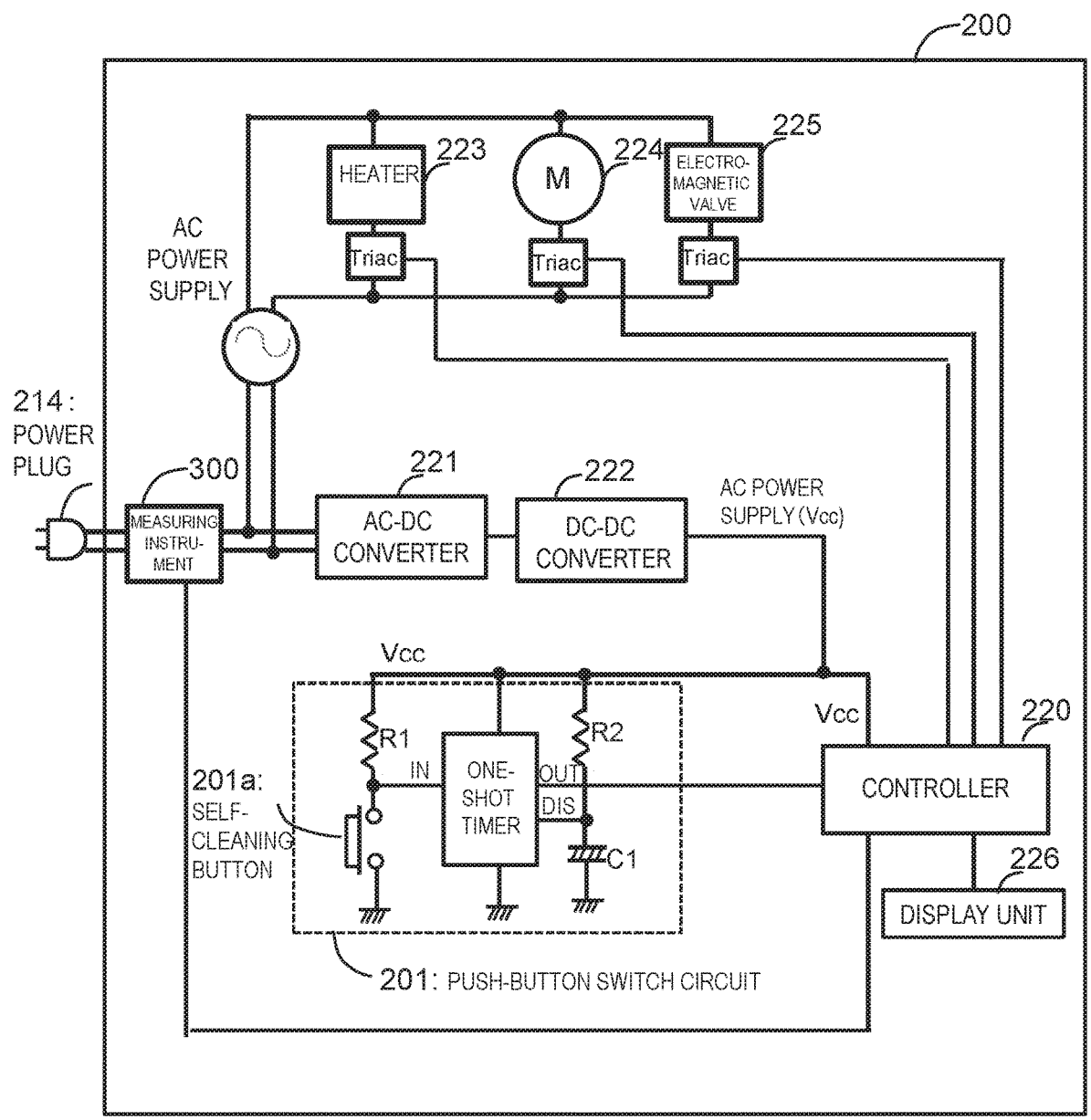
FIG. 15 is a diagram illustrating a configuration according to a ninth example embodiment of the present invention.

In the eighth example embodiment, an example in which the maintenance monitoring apparatus 100 is implemented on a computer system such as a server has been described. However, the maintenance monitoring apparatus 100 may, as a matter of course, be implemented on a controller (a microprocessor, etc.) in the coffee vending machine 200. In this case, the controller in the coffee vending machine 200 may acquire a measured value of current or power obtained by the measurement apparatus 300 and perform processing of the maintenance monitoring apparatus 100 according to the individual example embodiments described above. Alternatively, a maintenance operation may be managed in response to pressing of a self-cleaning button. FIG. 15 illustrates a configuration according the ninth example embodiment. In FIG. 15, an AC-DC converter 221 converts an AC (Alternate Current) power supply into a DC (Direct Current) power supply, and a DC-DC converter 222 converts the DC power supply (for example, 24 V or the like) from the AC-DC converter 221 to a 5V DC stabilized power supply. A controller 220 (a microprocessor, etc.) is connected to an output node of a push-button switch circuit 201 and performs a sequence of an automated cleaning maintenance operation in response to pressing of a self-cleaning button. In addition, in response to pressing of an order button not illustrated, a series of coffee supply operations is controlled. For example, first, a mill motor is activated to grind beans, and a hot-water valve is opened. Next, hot water is supplied to a brewer, and a coffee extraction operation is controlled. Finally, a paper filter feeding motor is activated.

When an automated cleaning button 201a is pressed, an input terminal IN of a one-shot timer drops to a ground potential (a Low level), and simultaneously, a High level is outputted to an output terminal OUT. In addition, a terminal DIS connected to a capacitor C1 is set in an open state, and the capacitor C1 is charged via a resistor R2. When the terminal voltage across the capacitor C1 reaches a predetermined voltage, the output terminal OUT drops back to a Low level, and the charges accumulated in the capacitor C1 are released via the terminal DIS. When receiving a High pulse (pulse width is determined by a time constant based on R2 and C1) from the one-shot timer, the controller 220 starts an automated cleaning control operation. For example, the following control processing is performed. First, a hot-water valve (an electromagnetic valve) 225 (for example, 212 in FIG. 17) is opened, and hot water is supplied to a brewer (for example, 205 in FIG. 17). Next, water is supplied from a water supply tank (for example, 209 in FIG. 17) to a hot water tank (for example, 210 in FIG. 17), and in response to a temperature detection result from a sensor (not illustrated) that senses a temperature of the hot water tank (for example, 210 in FIG. 17), a heater (for example, 211 in FIG. 17) is activated to heat the hot water tank (for example, 210 in FIG. 17). In addition, by managing the number of maintenance operations and the interval between maintenance operations, whether the maintenance has been executed or not is displayed on a display unit 226 such as an LED (Light Emitting Diode) or a liquid crystal panel. The controller 220 may receive a current or power measurement result obtained by the measurement apparatus 300 that senses a voltage or a current of a power supply line and perform maintenance monitoring operation (management of the number of maintenance operations, management of the intervals, etc.).

The controller 220 of the coffee vending machine 200 may be connected to a network via a communication interface (NIC: Network Interface Card) not illustrated and supply information about maintenance date and time, whether a maintenance has been executed or not, etc.

As application examples of the maintenance monitoring of cup-type vending machines described in the above example embodiments, the example embodiments are applicable to detection of a failure of paper feeding in a cup-type vending machine or detection of a lack of beans. The detection of a failure of paper feeding indicates detection of a state in which a used paper filter is clogged and feeding of the paper filter cannot be performed in a cup-type vending machine. The detection of a lack of beans indicates detection of change (timing) at which extracted coffee becomes "weak" because of some abnormality in a cup-type vending machine.

The individual example embodiments described above can be noted as follows (but not limited thereto).

(Note 1)

A maintenance monitoring apparatus, including:

a maintenance management part that monitors a current or power of a vending machine that provides a beverage by extracting the beverage from a raw material and manages as to whether an operation performed on the vending machine is a predetermined maintenance operation and whether the maintenance has been executed at an appropriate time interval and as many times as necessary; and a notification part that notifies that a maintenance has been executed or not.

(Note 2)

The maintenance monitoring apparatus according to note 1, wherein, upon detection of a maintenance operation of the vending machine based on a monitoring result of a current or power of the vending machine, the maintenance management part increments the number of executed maintenance operations by one; and wherein, if the maintenance number of times has reached a predetermined prescribed number, the maintenance management part outputs, via the notification part, a message that the maintenance operations have been completed within the predetermined time.

(Note 3)

The maintenance monitoring apparatus according to note 1 or 2, wherein, if an operation performed on the vending machine is not the maintenance operation and if an elapsed time since a last maintenance operation exceeds a predetermined time, the maintenance management part outputs, via the notification part, a message that a maintenance has not been executed.

(Note 4)

The maintenance monitoring apparatus according to any one of notes 1 to 3, wherein the maintenance management part compares a measured value of the current or power of the vending machine with a predetermined threshold value and determines, based on a result of the comparison, whether the operation performed on the vending machine is a maintenance operation executed in response to pressing of a self-cleaning button.

(Note 5)

The maintenance monitoring apparatus according to any one of notes 1 to 3, wherein, as a result of a comparison between a measured value of current or power of the vending machine and a first threshold value, if the maintenance management part determines that the operation is not a maintenance operation executed in response to pressing of a self-cleaning button, the maintenance management part determines whether the operation is a manual-cleaning maintenance operation based on the measurement result of the current or power of the vending machine.

(Note 6)

The maintenance monitoring apparatus according to note 5, wherein, if time during when the measured value of the current or power of the vending machine is continuously greater than or equal to a second threshold value and less than or equal to a third threshold value (second threshold value>third threshold value) is within a predetermined time range, the maintenance management part determines that the operation is the manual-cleaning maintenance operation.

(Note 7)

The maintenance monitoring apparatus according to any one of notes 1 to 4, wherein the maintenance management part calculates a current or power feature value from a measurement result of the current or power of the vending machine and determines whether the operation is a maintenance operation based on similarity in a feature value.

(Note 8)

The maintenance monitoring apparatus according to any one of notes 1 to 4, wherein the maintenance management part compares a measured value of the current or power of the vending machine with a predetermined threshold, wherein, if the measured value is greater than or equal to the threshold value, the maintenance management part acquires a power or current waveform of the vending machine and compares the acquired waveform with a previously learned learning model of a power or current waveform of an automated cleaning operation sequence, and wherein, if an accuracy of an estimation result is greater than or equal to a predetermined value, the maintenance management part determines that the operation is an automated cleaning maintenance operation.

(Note 9)

The maintenance monitoring apparatus according to any one of notes 1 to 4, wherein the maintenance management part compares a measured value of current or power of the vending machine with a predetermined fourth threshold value, wherein, if the measured value is greater than or equal to the fourth threshold value, the maintenance management part acquires a first waveform of the power or current of the vending machine and stores the first waveform in a storage unit;

wherein, if the measured value is less than the fourth threshold value, the maintenance management part compares the measured value with a predetermined fifth threshold value (fourth threshold value>fifth threshold value), wherein, if the measured value is greater than or equal to the fifth threshold value, the maintenance management part acquires a second waveform of the power or current of the vending machine and stores the second waveform in a storage unit, wherein, if the stored waveform is the first waveform, the maintenance management part compares the first waveform with a learning model of a first automated cleaning operation learned in advance, wherein, if the stored waveform is the second waveform, the maintenance management part compares the second waveform with a learning model of a second automated cleaning operation learned in advance, and wherein, if an accuracy of an estimation result is greater than or equal to a predetermined value, the maintenance management part determines that the operation is an automated cleaning maintenance operation.

(Note 10)

The maintenance monitoring apparatus according to note 9, wherein the learning model of the first automated cleaning operation corresponds to a maintenance operation learning model obtained when a heater operation of the vending machine is executed, and wherein the learning model of the second automated cleaning operation corresponds to a maintenance operation learning model obtained when a non-heater operation of the vending machine is executed.

(Note 11)

The maintenance monitoring apparatus according to any one of notes 1 to 3, wherein the maintenance management part compares a measured value of current or power of the vending machine with a predetermined sixth threshold, wherein, if the measured value is greater than or equal to the sixth threshold value, the maintenance management part acquires a first waveform of the power or current of the vending machine and stores the first waveform in a storage unit, wherein, if the measured value is less than the sixth threshold value, the maintenance management part compares the measured value with a predetermined seventh threshold value (sixth threshold value>seventh threshold value), wherein, if the measured value is greater than or equal to the seventh threshold value, the maintenance management part acquires a second waveform of the power or current of the vending machine and stores the second waveform in a storage unit, wherein the maintenance management part compares the stored first or second waveform with a previously learned learning model of a power or current waveform of a beverage extraction operation and a previously learned learning model of a power or current waveform of an automated cleaning operation and estimates the operation, and wherein, if an accuracy of an estimation result is greater than or equal to a predetermined value, the maintenance management part determines that the operation is the automated cleaning maintenance operation.

(Note 12)

The maintenance monitoring apparatus according to note 11, wherein, even if an elapsed time since a last maintenance operation has not exceeded a predetermined time, if a number of sales of beverages of the vending machine since the last maintenance time has exceeded a predetermined number, the maintenance management part outputs, via the notification part, a message that a maintenance has not been executed.

(Note 13)

A maintenance monitoring system, including:

a vending machine that provides a beverage by extracting the beverage from a raw material;

a measurement apparatus that measures a current or power of the vending machine and transmits a measurement result via a communication unit; and a maintenance monitoring apparatus, wherein the maintenance monitoring apparatus includes:

a maintenance management part that monitors a current or power of a vending machine that provides a beverage by extracting the beverage from a raw material and manages as to whether an operation performed on the vending machine is a predetermined maintenance operation and whether the maintenance has been executed at an appropriate time interval and as many times as necessary; and a notification part that notifies that a maintenance has been executed or not.

(Note 14)

The maintenance monitoring system according to note 13, wherein, upon detection of a maintenance operation of the vending machine based on a monitoring result of a current or power of the vending machine, the maintenance management part increments the number of executed maintenance operations by one, and wherein, if the maintenance number of times has reached a predetermined prescribed number, the maintenance management part outputs, via the notification part, a message that the maintenance operations have been completed within the predetermined time.

(Note 15)

The maintenance monitoring system according to note 13 or 14, wherein, if an operation performed on the vending machine is not the maintenance operation and if an elapsed time since a last maintenance operation exceeds a predetermined time, the maintenance management part outputs, via the notification part, a message that a maintenance has not been executed.

(Note 16)

The maintenance monitoring system according to any one of notes 13 to 15, wherein the maintenance management part compares a measured value of current or power of the vending machine with a predetermined threshold value and determines, based on a result of the comparison, whether the operation performed on the vending machine is a maintenance operation executed in response to pressing of a self-cleaning button.

(Note 17)

The maintenance monitoring system according to any one of notes 13 to 15, wherein, as a result of a comparison between a measured value of current or power of the vending machine and a first threshold value, if the maintenance management part determines that the operation is not a maintenance operation executed in response to pressing of a self-cleaning button, the maintenance management part determines whether the operation is a manual-cleaning maintenance operation based on the measurement result of the current or power of the vending machine.

(Note 18)

The maintenance monitoring system according to note 17, wherein, if time during when the measured value of the current or power of the vending machine is continuously greater than or equal to a second threshold value and less than or equal to a third threshold value (second threshold value>third threshold value) is within a predetermined time range, the maintenance management part determines that the operation is the manual-cleaning maintenance operation.

(Note 19)

The maintenance monitoring system according to any one of notes 13 to 16, wherein the maintenance management part calculates a current or power feature value from a measurement result of a current or power of the vending machine and determines whether the operation is a maintenance operation based on similarity in a feature value.

(Note 20)

The maintenance monitoring system according to any one of notes 13 to 16, wherein the maintenance management part compares a measured value of current or power of the vending machine with a predetermined threshold, wherein, if the measured value is greater than or equal to the threshold value, the maintenance management part acquires a power or current waveform of the vending machine and compares the acquired waveform with a previously learned learning model of a power or current waveform of an automated cleaning operation sequence, and wherein, if an accuracy of an estimation result is greater than or equal to a predetermined value, the maintenance management part determines that the operation is an automated cleaning maintenance operation.

(Note 21)

The maintenance monitoring system according to any one of notes 13 to 16, wherein the maintenance management part compares a measured value of current or power of the vending machine with a predetermined fourth threshold, wherein, if the measured value is greater than or equal to the fourth threshold value, the maintenance management part acquires a first waveform of the power or current of the vending machine and stores the first waveform in a storage unit, wherein, if the measured value is less than the fourth threshold value, the maintenance management part compares the measured value with a predetermined fifth threshold value (fourth threshold value>fifth threshold value), wherein, if the measured value is greater than or equal to the fifth threshold value, the maintenance management part acquires a second waveform of the power or current of the vending machine and stores the second waveform in a storage unit, wherein, if the stored waveform is the first waveform, the maintenance management part compares the first waveform with a learning model of a first automated cleaning operation learned in advance, wherein, if the stored waveform is the second waveform, the maintenance management part compares the second waveform with a learning model of a second automated cleaning operation learned in advance, and wherein, if an accuracy of an estimation result is greater than or equal to a predetermined value, the maintenance management part determines that the operation is an automated cleaning maintenance operation.

(Note 22)

The maintenance monitoring system according to note 21, wherein the learning model of the first automated cleaning operation corresponds to a maintenance operation learning model obtained when a heater operation of the vending machine is executed, and wherein the learning model of the second automated cleaning operation corresponds to a maintenance operation learning model obtained when a non-heater operation of the vending machine is executed.

(Note 23)

The maintenance monitoring system according to any one of notes 13 to 16, wherein the maintenance management part compares a measured value of current or power of the vending machine with a predetermined sixth threshold, wherein, if the measured value is greater than or equal to the sixth threshold value, the maintenance management part acquires a first waveform of the power or current of the vending machine and stores the first waveform in a storage unit, wherein, if the measured value is less than the sixth threshold value, the maintenance management part compares the measured value with a predetermined seventh threshold value (sixth threshold value>seventh threshold value), wherein, if the measured value is greater than or equal to the seventh threshold value, the maintenance management part acquires a second waveform of the power or current of the vending machine and stores the second waveform in a storage unit, wherein the maintenance management part compares the stored first or second waveform with a previously learned learning model of a power or current waveform of a beverage extraction operation and a previously learned learning model of a power or current waveform of an automated cleaning operation and estimates the operation, and wherein, if an accuracy of an estimation result is greater than or equal to a predetermined value, the maintenance management part determines that the operation is the automated cleaning maintenance operation.

(Note 24)

The maintenance monitoring system according to note 23, wherein, even if an elapsed time since a last maintenance operation has not exceeded a predetermined time, if a number of sales of beverages of the vending machine since the last maintenance time has exceeded a predetermined number, the maintenance management part outputs, via the notification part, a message that a maintenance has not been executed.

(Note 25)

A maintenance monitoring method, including:

monitoring a current or power of a vending machine that provides a beverage by extracting the beverage from a raw material;

managing whether an operation performed on the vending machine is a predetermined maintenance operation and whether the maintenance has been executed at an appropriate time interval and as many times as necessary; and notifying that a maintenance has been executed or not.

(Note 26)

The maintenance monitoring method according to note 25, wherein, if a maintenance operation of the vending machine is detected based on a monitoring result of a current or power of the vending machine, the number of executed maintenance operations is incremented by one, and wherein, if the maintenance number of times has reached a predetermined prescribed number, a message that the maintenance operations have been completed within the predetermined time is outputted.

(Note 27)

The maintenance monitoring method according to note 25 or 26, wherein, if an operation performed on the vending machine is not the maintenance operation and if an elapsed time since a last maintenance operation exceeds a predetermined time, a message that a maintenance has not been executed is outputted.

(Note 28)

The maintenance monitoring method according to any one of notes 25 to 27, wherein a measured value of current or power of the vending machine is compared with a predetermined threshold value and, based on a result of the comparison, whether the operation performed on the vending machine is a maintenance operation executed in response to pressing of a self-cleaning button is determined.

(Note 29)

The maintenance monitoring method according to any one of notes 25 to 28, wherein, as a result of a comparison between a measured value of current or power of the vending machine and a first threshold value, if it is determined that the operation is not a maintenance operation executed in response to pressing of a self-cleaning button, whether the operation is a manual-cleaning maintenance operation is determined based on the measurement result of the current or power of the vending machine.

(Note 30)

The maintenance monitoring method according to note 29, wherein, if time during when the measured value of the current or power of the vending machine is continuously greater than or equal to a second threshold value and less than or equal to a third threshold value (second threshold value>third threshold value) is within a predetermined time range, it is determined that the operation is the manual-cleaning maintenance operation.

(Note 31)

The maintenance monitoring method according to any one of notes 25 to 29, wherein a current or power feature value is calculated from a measurement result of a current or power of the vending machine, and whether the operation is a maintenance operation is determined based on similarity in a feature value.

(Note 32)

The maintenance monitoring method according to any one of notes 25 to 29, wherein a measured value of current or power of the vending machine is compared with a predetermined threshold, wherein, if the measured value is greater than or equal to the threshold value, a power or current waveform of the vending machine is acquired, and the acquired waveform is compared with a previously learned learning model of a power or current waveform of an automated cleaning operation sequence, and wherein, if an accuracy of an estimation result is greater than or equal to a predetermined value, it is determined that the operation is an automated cleaning maintenance operation.

(Note 33)

The maintenance monitoring method according to any one of notes 25 to 29, wherein a measured value of current or power of the vending machine is compared with a predetermined fourth threshold, wherein, if the measured value is greater than or equal to the fourth threshold value, a first waveform of the power or current of the vending machine is acquired, and the first waveform is stored in a storage unit, wherein, if the measured value is less than the fourth threshold value, the measured value is compared with a predetermined fifth threshold value (fourth threshold value>fifth threshold value), wherein, if the measured value is greater than or equal to the fifth threshold value, a second waveform of the power or current of the vending machine is acquired, and the second waveform is stored in a storage unit, wherein, if the stored waveform is the first waveform, the first waveform is compared with a learning model of a first automated cleaning operation learned in advance, wherein, if the stored waveform is the second waveform, the second waveform is compared with a learning model of a second automated cleaning operation learned in advance, and wherein, if an accuracy of an estimation result is greater than or equal to a predetermined value, it is determined that the operation is an automated cleaning maintenance operation.

(Note 34)

The maintenance monitoring method according to note 33, wherein the learning model of the first automated cleaning operation corresponds to a maintenance operation learning model obtained when a heater operation of the vending machine is executed, and wherein the learning model of the second automated cleaning operation corresponds to a maintenance operation learning model obtained when a non-heater operation of the vending machine is executed.

(Note 35)

The maintenance monitoring method according to any one of notes 25 to 27, wherein a measured value of current or power of the vending machine is compared with a predetermined sixth threshold, wherein, if the measured value is greater than or equal to the sixth threshold value, a first waveform of the power or current of the vending machine is acquired, and the first waveform is stored in a storage unit, wherein, if the measured value is less than the sixth threshold value, the measured value is compared with a predetermined seventh threshold value (sixth threshold value>seventh threshold value), wherein, if the measured value is greater than or equal to the seventh threshold value, a second waveform of the power or current of the vending machine is acquired, and the second waveform is stored in a storage unit, wherein the stored first or second waveform is compared with a previously learned learning model of a power or current waveform of a beverage extraction operation and a previously learned learning model of a power or current waveform of an automated cleaning operation, and the operation is estimated, and wherein, if an accuracy of an estimation result is greater than or equal to a predetermined value, it is determined that the operation is the automated cleaning maintenance operation.

(Note 36)

The maintenance monitoring method according to note 35, wherein, even if an elapsed time since a last maintenance operation has not exceeded a predetermined time, if a number of sales of beverages of the vending machine since the last maintenance time has exceeded a predetermined number, a message that a maintenance has not been executed is outputted by the notification part.

(Note 37)

A program causing a computer to perform:

maintenance management processing for monitoring a current or power of a vending machine that provides a beverage by extracting the beverage from a raw material and managing whether an operation performed on the vending machine is a predetermined maintenance operation and whether the maintenance has been executed at an appropriate time interval and as many times as necessary; and processing for notifying that a maintenance has been executed or not.

(Note 38)

The program according to note 37, wherein, in the maintenance management processing, if a maintenance operation of the vending machine is detected based on a monitoring result of a current or power of the vending machine, the number of executed maintenance operations is incremented by one, and wherein, if the maintenance number of times has reached a predetermined prescribed number, a message that the maintenance operations have been completed within the predetermined time is outputted via the notification part.

(Note 39)

The program according to note 37 or 38, wherein, in the maintenance management processing, if an operation performed on the vending machine is not the maintenance operation and if an elapsed time since a last maintenance operation exceeds a predetermined time, a message that a maintenance has not been executed is outputted by the notification part.

(Note 40)

The program according to any one of notes 37 to 39, wherein, in the maintenance management processing, a measured value of current or power of the vending machine is compared with a predetermined threshold value and, based on a result of the comparison, whether the operation performed on the vending machine is a maintenance operation executed in response to pressing of a self-cleaning button is determined.

(Note 41)

The program according to any one of notes 37 to 39, wherein, in the maintenance management processing, as a result of a comparison between a measured value of current or power of the vending machine and a first threshold value, if it is determined that the operation is not a maintenance operation executed in response to pressing of a self-cleaning button, whether the operation is a manual-cleaning maintenance operation is determined based on the measurement result of the current or power of the vending machine.

(Note 42)

The program according to note 41, wherein, in the maintenance management processing, if time during when the measured value of the current or power of the vending machine is continuously greater than or equal to a second threshold value and less than or equal to a third threshold value (second threshold value>third threshold value) is within a predetermined time range, it is determined that the operation is the manual-cleaning maintenance operation.

(Note 43)

The program according to any one of notes 37 to 40, wherein, in the maintenance management processing, a current or power feature value is calculated from a measurement result of a current or power of the vending machine, and whether the operation is a maintenance operation is determined based on similarity in a feature value.

(Note 44)

The maintenance monitoring method according to any one of notes 37 to 40, wherein, in the maintenance management processing, a measured value of current or power of the vending machine is compared with a predetermined threshold, wherein, if the measured value is greater than or equal to the threshold value, a power or current waveform of the vending machine is acquired, and the acquired waveform is compared with a previously learned learning model of a power or current waveform of an automated cleaning operation sequence, and wherein, if an accuracy of an estimation result is greater than or equal to a predetermined value, it is determined that the operation is an automated cleaning maintenance operation.

(Note 45)

The program according to any one of notes 37 to 41, wherein, in the maintenance management processing, a measured value of current or power of the vending machine is compared with a predetermined fourth threshold, wherein, if the measured value is greater than or equal to the fourth threshold value, a first waveform of the power or current of the vending machine is acquired, and the first waveform is stored in a storage unit, wherein, if the measured value is less than the fourth threshold value, the measured value is compared with a predetermined fifth threshold value (fourth threshold value>fifth threshold value), wherein, if the measured value is greater than or equal to the fifth threshold value, a second waveform of the power or current of the vending machine is acquired, and the second waveform is stored in a storage unit, wherein, if the stored waveform is the first waveform, the first waveform is compared with a learning model of a first automated cleaning operation learned in advance, wherein, if the stored waveform is the second waveform, the second waveform is compared with a learning model of a second automated cleaning operation learned in advance, and wherein, if an accuracy of an estimation result is greater than or equal to a predetermined value, it is determined that the operation is an automated cleaning maintenance operation.

(Note 46)

The program according to note 45, wherein the learning model of the first automated cleaning operation corresponds to a maintenance operation learning model obtained when a heater operation of the vending machine is executed, and wherein the learning model of the second automated cleaning operation corresponds to a maintenance operation learning model obtained when a non-heater operation of the vending machine is executed.

(Note 47)

The program according to any one of notes 37 to 39, wherein, in the maintenance management processing, a measured value of current or power of the vending machine is compared with a predetermined sixth threshold, wherein, if the measured value is greater than or equal to the sixth threshold value, a first waveform of the power or current of the vending machine is acquired, and the first waveform is stored in a storage unit, wherein, if the measured value is less than the sixth threshold value, the measured value is compared with a predetermined seventh threshold value (sixth threshold value>seventh threshold value), wherein, if the measured value is greater than or equal to the seventh threshold value, a second waveform of the power or current of the vending machine is acquired, and the second waveform is stored in a storage unit, wherein the stored first or second waveform is compared with a previously learned learning model of a power or current waveform of a beverage extraction operation and a previously learned learning model of a power or current waveform of an automated cleaning operation, and the operation is estimated, and wherein, if an accuracy of an estimation result is greater than or equal to a predetermined value, it is determined that the operation is the automated cleaning maintenance operation.

(Note 48)

The program according to note 47, wherein, in the maintenance management processing, even if an elapsed time since a last maintenance operation has not exceeded a predetermined time, if a number of sales of beverages of the vending machine since the last maintenance time has exceeded a predetermined number, a message that a maintenance has not been executed is outputted by the notification part.

The disclosure of the above PTLs 1 to 3 is incorporated herein by reference thereto. Variations and adjustments of the example embodiments and examples are possible within the scope of the overall disclosure (including the claims) of the present invention and based on the basic technical concept of the present invention. Various combinations and selections of various disclosed elements (including the elements in each of the notes, examples, drawings, etc.) are possible within the scope of the present invention. Namely, the present invention of course includes various variations and modifications that could be made by those skilled in the art according to the overall disclosure including the claims and the technical concept. The description discloses numerical value ranges. However, even if the description does not particularly disclose arbitrary numerical values or small ranges included in the ranges, these values and ranges should be deemed to have been specifically disclosed.

What is claimed is:

1. A maintenance monitoring apparatus comprising:
a processor; and
a memory storing a program executable by the processor, wherein the processor, when executing the program stored in the memory is configured to
monitor a current or power of a vending machine that provides a beverage by extracting the beverage from a raw material and performs management as to whether an operation performed on the vending machine is a predetermined maintenance operation, and whether the maintenance operation is executed at an appropriate time interval and as many times as necessary; and
notify that a maintenance has been performed or not performed, wherein the processor is further configured to compare a measured value of the current or power of the vending machine with a predetermined threshold value, wherein, when the measured value is greater than or equal to a predetermined threshold value, the processor acquires a power or current waveform of the vending machine and compares the acquired waveform with a learning model of a power or current waveform of an automated cleaning operation sequence, the learning model learned in advance, and wherein, when an accuracy of an estimation result is greater than or equal to a predetermined value, the processor determines that the operation is an automated cleaning maintenance operation.

2. The maintenance monitoring apparatus according to claim 1, wherein the processor is further configured to, upon detection of a maintenance operation of the vending machine based on a monitoring result of a current or power of the vending machine, increment a number of times of the maintenance by one, and wherein the processor is configured to, if the number of times of the maintenance reaches a predetermined prescribed number, output a message that a maintenance within the predetermined time period has been completed.

3. The maintenance monitoring apparatus according to claim 1, wherein the processor is further configured to, if an operation performed on the vending machine is not the maintenance operation, and if an elapsed time since a last maintenance exceeds a predetermined time, output a message that a maintenance has not been executed.

4. The maintenance monitoring apparatus according to claim 1, wherein the processor is further configured to compare a measured value of the current or power of the vending machine with a predetermined threshold value and determines, based on a result of the comparison, whether the operation performed on the vending machine is a maintenance operation executed in response to pressing of a self-cleaning button.

5. The maintenance monitoring apparatus according to claim 1, wherein the processor is further configured to, when the processor, as a result of a comparison of a measured value of the current or power of the vending machine with a first threshold value, determines that the operation is not a maintenance operation executed in response to pressing of a self-cleaning button, determine whether the operation is a manual-cleaning maintenance operation, based on the measurement result of the current or power of the vending machine.

6. The maintenance monitoring apparatus according to claim 5, wherein the processor is further configured to, if a time during when the measured value of the current or power of the vending machine is continuously greater than or equal to a second threshold value and less than or equal to a third threshold value, where the second threshold value is greater than the third threshold value, is within a predetermined time range, determine that the operation is the manual-cleaning maintenance operation.

7. The maintenance monitoring apparatus according to claim 1, wherein the processor is further configured to calculate a current or power feature value from a measurement result of the current or power of the vending machine to determine whether the operation is a maintenance operation, based on a similarity degree of the feature value.

8. The maintenance monitoring apparatus according to claim 1, wherein, even when an elapsed time since a last maintenance operation has not exceeded a predetermined time, if a number of sales of beverages of the vending machine since a last maintenance time exceeds a predetermined number, the processor outputs, a message that a maintenance has not been executed.

9. A maintenance monitoring system, comprising:
a vending machine that provides a beverage by extracting the beverage from a raw material;
a measurement apparatus that measures a current or power of the vending machine and transmits a measurement result via a communication unit of the measurement apparatus; and
the maintenance monitoring apparatus according to claim 1.

10. A maintenance monitoring apparatus comprising:
a processor; and
a memory storing a program executable by the processor,
wherein the processor, when executing the program stored in the memory is configured to
monitor a current or power of a vending machine that provides a beverage by extracting the beverage from a raw material and performs management as to whether an operation performed on the vending machine is a predetermined maintenance operation, and whether the maintenance operation is executed at an appropriate time interval and as many times as necessary; and
notify that a maintenance has been performed or not performed,
wherein the processor is further configured to compare a measured value of the current or power of the vending machine with a predetermined fourth threshold value,
in a case where the measured value is greater than or equal to the fourth threshold value, the processor acquires a first waveform of the power or current of the vending machine and stores the first waveform in a storage unit,
in a case where the measured value is less than the fourth threshold value, the processor compares the measured value with a predetermined fifth threshold value, where the fourth threshold value is greater than the fifth threshold value,
in a case where the measured value is greater than or equal to the fifth threshold value, the processor acquires a second waveform of the power or current of the vending machine and stores the second waveform in a storage unit, wherein
in a case where the waveform stored is the first waveform, the processor compares the first waveform with a learning model of a first automated cleaning operation learned in advance;
in a case where the stored waveform is the second waveform the processor compares the second waveform with a learning model of a second automated cleaning operation learned in advance, and
wherein, when an accuracy of an estimation result is greater than or equal to a predetermined value, the processor determines that the operation is an automated cleaning maintenance operation.

11. The maintenance monitoring apparatus according to claim 10, wherein the learning model of the first automated cleaning operation corresponds to a maintenance operation learning model obtained when a heater included in the vending machine operates, and wherein the learning model of the second automated cleaning operation corresponds to a maintenance operation learning model obtained when the heater included in the vending machine does not operate.

12. A maintenance monitoring apparatus comprising:
a processor; and
a memory storing a program executable by the processor,
wherein the processor, when executing the program stored in the memory is configured to
monitor a current or power of a vending machine that provides a beverage by extracting the beverage from a raw material and performs management as to whether an operation performed on the vending machine is a predetermined maintenance operation, and whether the maintenance operation is executed at an appropriate time interval and as many times as necessary; and
notify that a maintenance has been performed or not performed,
wherein the processor is further configured to compare a measured value of the current or power of the vending machine with a predetermined sixth threshold value,
in a case where the measured value is greater than or equal to the sixth threshold value, the processor acquires a first waveform of the power or current of the vending machine and stores the first waveform in a storage unit,
in a case where the measured value is less than the sixth threshold value, the processor compares the measured value with a predetermined seventh threshold value (where the sixth threshold is greater than the seventh threshold value),
wherein the processor compares a measured value of the current or power of the vending machine with the predetermined sixth threshold value,
in a case where the measured value is greater than or equal to the seventh threshold value, the processor acquires a second waveform of the power or current of the vending machine and stores the second waveform in a storage unit,
wherein the processor compares the stored first or second waveform with a learning model of a power or current waveform of a beverage extraction operation learned in advance and a learning model of a power or current waveform of an automated cleaning operation and estimates the operation, and
if an accuracy of an estimation result is greater than or equal to a predetermined value, the processor determines that the operation is the automated cleaning maintenance operation.

13. A maintenance monitoring method, comprising:
monitoring a current or power of a vending machine that provides a beverage by extracting the beverage from a raw material;
managing as to whether an operation performed on the vending machine is a predetermined maintenance operation and whether the maintenance is executed at an appropriate time interval and as many times as necessary; and
notifying that a maintenance has been executed or not
comparing a measured value of the current or power of the vending machine with a predetermined threshold value;
when the measured value is greater than or equal to a predetermined threshold value, acquiring a power or current waveform of the vending machine and comparing the acquired waveform with a learning model of a power or current waveform of an automated cleaning operation sequence, the learning model learned in advance; and
when an accuracy of an estimation result is greater than or equal to a predetermined value, determining that the operation is an automated cleaning maintenance operation.

14. The maintenance monitoring method according to claim 13, comprising:
upon detection of a maintenance operation of the vending machine based on a monitoring result of a current or power of the vending machine, incrementing a number of times of the maintenance by one; and
if the number of times of the maintenance reaches a predetermined prescribed number, outputting a message that a maintenance within the predetermined time period has been completed.

15. The maintenance monitoring method according to claim 13, comprising:
comparing a measured value of the current or power of the vending machine with a predetermined threshold value and
determining, based on a result of the comparison, whether the operation performed on the vending machine is a maintenance operation executed in response to pressing of a self-cleaning button.

16. The maintenance monitoring method according to claim 13, comprising:
when, as a result of a comparison of a measured value of the current or power of the vending machine with a first threshold value, it is determined that the operation is not a maintenance operation executed in response to pressing of a self-cleaning button,
determining whether the operation is a manual-cleaning maintenance operation, based on the measurement result of the current or power of the vending machine.

17. The maintenance monitoring method according to claim 13,
even when an elapsed time since a last maintenance operation has not exceeded a predetermined time, if a number of sales of beverages of the vending machine since a last maintenance time exceeds a predetermined number,
outputting, a message that a maintenance has not been executed.

18. A non-transitory computer readable medium storing a program causing a computer to execute processing comprising:
monitoring a current or power of a vending machine that provides a beverage by extracting the beverage from a raw material;
managing as to whether an operation performed on the vending machine is a predetermined maintenance operation and whether the maintenance is executed at an appropriate time interval and as many times as necessary; and
notifying that a maintenance has been executed or not, the processing further comprising:
comparing a measured value of the current or power of the vending machine with a predetermined threshold value;
when the measured value is greater than or equal to a predetermined threshold value, acquiring a power or current waveform of the vending machine and comparing the acquired waveform with a learning model of a power or current waveform of an automated cleaning operation sequence, the learning model learned in advance; and
when an accuracy of an estimation result is greater than or equal to a predetermined value, determining that the operation is an automated cleaning maintenance operation.

19. The non-transitory computer readable medium according to claim 18, storing a program causing a computer to execute processing comprising:

upon detection of a maintenance operation of the vending machine based on a monitoring result of a current or power of the vending machine, incrementing a number of times of the maintenance by one; and if the number of times of the maintenance reaches a predetermined prescribed number, outputting a message that a maintenance within the predetermined time period has been completed.

* * * * *